(12) United States Patent
Syukuri

(10) Patent No.: US 6,218,795 B1
(45) Date of Patent: Apr. 17, 2001

(54) ROTOR MAGNETIC POLE POSITION DETECTION DEVICE

(75) Inventor: Youichi Syukuri, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/464,411

(22) Filed: Dec. 16, 1999

(30) Foreign Application Priority Data

Dec. 17, 1998 (JP) .................................................. 10-358975

(51) Int. Cl.⁷ ........................................................ H02P 1/18
(52) U.S. Cl. ............................ 318/254; 318/138; 318/439
(58) Field of Search ..................................... 318/138, 439, 318/254, 805, 811

(56) References Cited

U.S. PATENT DOCUMENTS

| | | | |
|---|---|---|---|
| 4,983,895 | * 1/1991 | Koharagi et al. | 318/254 |
| 5,345,156 | * 9/1994 | Moreira | 318/254 |
| 5,373,223 | * 12/1994 | Akagi et al. | 318/722 |
| 5,486,743 | * 1/1996 | Nagai | 318/439 |
| 5,517,095 | * 5/1996 | Carobolante et al. | 318/254 |
| 5,729,102 | * 3/1998 | Gotou et al. | 318/254 |
| 5,814,957 | * 9/1998 | Yoshida | 318/439 |
| 5,866,998 | * 2/1999 | Menegoli | 318/254 |
| 6,034,493 | * 3/2000 | Boyd et al. | 318/254 |
| 6,107,776 | * 8/2000 | Nakazawa | 318/811 |
| 6,118,244 | * 9/2000 | Steinbusch | 318/603 |

FOREIGN PATENT DOCUMENTS 5091790    4/1919   (JP) .

* cited by examiner

Primary Examiner—Robert E. Nappi
Assistant Examiner—Rina I. Duda
(74) Attorney, Agent, or Firm—Stevens, Davis, Miller & Mosher, LLP

(57) ABSTRACT

A rotor magnetic pole position detection device detects a zero-cross point in a induced voltage induced in a stationary winding under a PWM control, and is used in a DC brushless motor drive control apparatus to be driven in a sensorless mode. A detection circuit detects terminal voltages of a plurality of stationary windings. A reference voltage generation circuit generates a reference voltage. A comparison unit compares the terminal voltages with the reference voltage. A speed command voltage generation unit generates a PWM ON-width control signal. A PWM control signal generation unit generates a PWM control signal which has a duty ratio corresponding to the PWM ON-width control signal. A logical operating unit obtains a phase signal from an output signal of the comparison unit, and outputs an energization timing signal based on the phase signal and the PWM control signal. A driver circuit energizes the stationary windings based on the energization timing signal. The logical operating unit detects whether or not the induced voltage of each of the stationary windings is zero-crossed at a rising or falling edge of a triangle wave generation clock for generating the PWM control signal.

13 Claims, 15 Drawing Sheets

ROTOR MAGNETIC POLE POSITION DETECTION DEVICE

BACKGROUND OF THE INVENTION

1. Field of the Invention

The present invention relates to a rotor magnetic pole position detection device in a DC brushless motor drive control apparatus for performing a sensorless drive control under a pulse width modulation (PWM).

2. Description of the Related Art

A conventional DC brushless motor is generallyarranged so that an output circuit including switching elements and so forth chops a DC power to sequentially pass a current through stationary windings of a plurality of phases, whereby a rotary magnetic field is generated to rotate a rotor. A control signal applied to the output circuit at this time is required to be an appropriate signal corresponding to a rotary state of the rotor. To this end, a positional sensor such as a Hall-effect element is provided to detect the rotational position of the rotor. However, recent study and development has been directed to a brushless motor which has a structure of detecting the rotary position of the rotor without using such a positional sensor as a Hall-effect element.

Explanation will be made below as to a principle of detecting the rotary position of the rotor with use of FIG. 12.

FIG. 12 shows voltage waveforms corresponding to one phase under no PWM control in the prior art. In FIG. 12, reference numeral 43 denotes a reference voltage, 44 denotes a waveform of a terminal voltage, 45 denotes an output of a comparator for comparing the reference voltage 43 and the terminal voltage, and 54 denotes a zero-cross point. The principle of detecting the rotary position of the rotor is as follows. The terminal voltage generated in the stationary winding by rotation of the rotor is detected. A phase of the induced voltage in the stationary winding at the zero-cross point (i.e., a positional signal indicative of a predetermined rotary position of the rotor) is detected based on the timing at which the detected terminal voltage coincides with the preset reference voltage.

In the above case, when a continuous ON signal is output during its energization period of the stationary winding as a control signal, the terminal voltage of the stationary winding can be continuously detected. In the PWM control system, however, it becomes impossible to detect the terminal voltage of the stationary winding as it is. In other words, when the PWM control signal which repeats ON/OFF at a fast period during the energization period of the stationary winding is applied, the terminal voltage of the stationary winding can also be detected intermittently as to cross the reference voltage many times as shown in FIG. 13A. Therefore, it is impossible to detect the zero-cross point 54 of the induced voltage, just as it is. FIG. 13A shows waveforms of voltages corresponding to one phase under the PWM control in which a conventional lower arm is switched and waveforms under the PWM control. FIG. 13B shows waveforms of voltages corresponding one phase under the PWM control in which a conventional upper arm is switched. FIG. 15 is a major part of a conventional DC brushless motor drive control device.

The above will be more detailed. As shown in FIG. 15, a DC brushless motor includes a stator having stator coils SU, SV and SW of three phases U, V and W, and a rotor R of a permanent magnet. The DC brushless motor includes a unit (which is called as "upper arm" hereinafter) which has three PNP-type transistors Tr1, Tr2 and Tr3 as switching elements and three flywheel diodes D1, D2 and D3 connected in parallel to these transistors, and a unit (which is called as "lower arm" hereinafter) which has three NPN-type transistors Tr4, Tr5 and Tr6 and three flywheel diodes D4, D5 and D6 connected in parallel to these transistors, as driving circuit for performing the PWM control. The ends of the stator coils SU, SV and SW of the phases U, V and W are connected. The other ends of the stator coils SU, SV and SW are connected to the common connection points between the pairs of the PNP-type transistors Tr1, Tr2 and Tr3 and the NPN-type transistors Tr4, Tr5 and Tr6, respectively. The collectors and emitters of the arms are connected to two buses, and a common connection point ON to the both arms is arranged to output ½ of a voltage between the buses.

When such a DC brushless motor is controlled in the PWM manner, this can be realized by performing the PWM control by switching either one of the upper and lower arms using logical operating means such as a micro-computer. The terminal voltage waveform 46 shown in FIG. 13A shows a waveform which is obtained when the lower arm is subjected to the PWM control. When the upper arm is subjected to the PWM control, on the contrary, the terminal voltage waveform shown in FIG. 13B is obtained. To put it simply, these two terminal voltages are inverted mutually with respect to the reference voltage, so that they are basically the same. Accordingly, in view of the fact that the zero-cross point 54 of the induced voltage can not be detected by intermittently detecting the reference voltage crossed many times under the PWM control, the PWM control in which the upper arm is switched is the same as the PWM control in which the lower arm is switched.

Though the above explanation has been briefly made, more detailed explanation will be directed to the waveforms generated when the upper and lower arms are switched. Explanation will first be made as to when the upper arm is subjected to the PWM control. When one (e.g., Tr1) of the three PNP-type transistors as the switching elements in the upper arm is switched (ON/OFF) under the PWM control, a current flows through the stator coils SU and SV during an ON state of the NPN-type transistor Tr5 in the lower arm. At this time, the voltage waveform becomes one shown in duration ① of the terminal voltage waveform in FIG. 13B. That is, when the switching element is turned ON under the PWM control, a voltage lower by a voltage drop of the element Tr1 than a (+) power voltage of a power source E appears as a U-phase terminal voltage. When the switching element is turned OFF under the PWM control, the electric energy accumulated in the stator coils SU and SV is discharged through the flywheel diode D4. Next, while either one of the remaining two switching elements in the upper arm is in its ON state, the voltage waveform becomes either one of the voltage waveforms in two duration ② in FIG. 13B. That is, when either one of the PNP-type transistors Tr2 and Tr3 as the switching elements is switched (turned ON or OFF) and is in its ON state and when either one of the NPN-type transistors Tr5 and Tr6 not connected to the elements Tr2 and Tr3 is in its ON state, the induced voltage appears in the terminal of the stator coil SU. When the above switching element is switched to its OFF state, the U-phase terminal voltage shows a neutral point of the terminal voltage between the V- and W-phase terminal voltages (i.e., a value nearly equal to a (−) power voltage of the power source E), so that the voltage in duration ② has such a shape that its pulse height increases or decreases with time. Further, when the NPN-type transistor Tr4 in the lower arm is turned ON and the PNP-type transistor Tr2 is turned ON or OFF, a voltage higher by a voltage drop of the element than the (−) power voltage appears and has such a waveform shown in duration ③ in FIG. 13B.

Explanation will then be made as to a case where the lower arm is subjected to the PWM control. When one (e.g., Tr4) of the three NPN-type transistors as switching elements in the lower arm is switched (turned ON or OFF) under the PWM control, a current flows through the stator coils SU and SV during the ON state of the PNP-type transistor Tr2 in the upper arm. At this time, a voltage waveform becomes one shown in duration ① of the terminal voltage waveform in FIG. 13A. That is, when this switching element is turned ON under the PWM control, a voltage higher by a voltage drop of the element Tr4 than the (−) power voltage of the power source E appears as the U-phase terminal voltage. When this element is turned OFF under the PWM control, an electric energy accumulated in the stator coils SU and SV is discharged through the flywheel diode D1. Next, when either one of the remaining two switching elements in the lower arm is in its ON state, a voltage has such a waveform shown in either one of two duration ② in FIG. 13A. That is, when either one of the NPN-type transistors Tr5 and Tr6 as switching elements is switched (turned ON or OFF) and is in its ON state and when either one of the PNP-type transistors Tr2 and Tr3 not connected to the elements Tr5 and Tr6 is in its ON state, an induced voltage is generated in the terminal of the stator coil SU. When the above element is put to its OFF state under the PWM control, the U-phase terminal voltage becomes a neutral point between the terminal voltages of the V- and W-phases (i.e., a voltage nearly equal to the (+) power voltage of the power source E), so that the voltage in duration ② has such a waveform that its groove depth increases or decreases with time. Further, when the PNP-type transistor Tr2 in the upper arm is turned ON and when the NPN-type transistor Tr4 is turned ON or OFF, the voltage has a lower value by a voltage drop of this element than the (−) power voltage and has a waveform shown in duration ③ in FIG. 13B.

In this way, although there are the slightly differences in the detailed respects, the PWM control in which the upper arm is switched and the PWM control in which the lower arm is switched are the same.

Explanation will then be made as to how to detect the zero-cross point 54. In order to detect the zero-cross point in the induced voltage of the stationary winding even when a control signal is intermittently output based on the PWM control system and so forth, the following method is considered. That is, during the period in which a PWM control signal is in the OFF state (i.e., during a period in which the induced voltage of the stationary winding can not be detected), it is arranged not to detect a signal calculated by comparing the induced voltage of the stationary winding and the reference voltage.

The above method will be explained using the waveforms in FIG. 13A and the waveforms under the PWM control. In FIG. 13A, reference numeral 43 denotes a reference voltage, 46 denotes a terminal voltage waveform, 47 denotes an output of a comparator under the PWM control, 48 denotes an enable signal, 49 denotes a waveform detected when the comparator output 47 under the PWM control is masked with the enable signal 48, and 54 denotes a zero-cross point. In FIG. 7A, the enable signal 48 which permits the detection only during the period in which the induced voltage of the stationary winding can be detected based on the PWM control signal (i.e., when the control signal is at the H level) is generated. The detection operation is carried out based on the enable signal 48.

The comparator output 47 remains the H level after the zero-cross point because the output is higher than the reference voltage 43. Thus, when the enable signal 48 is applied to the logical operating means, the H level continues to be output. Before the zero-cross point, on the other hand, the enable signal 48 is at the H level during the OFF state of the PWM control signal, so that the comparator output 47 is masked to be at the L level. However, as the H level duration of a counter electromotive voltage caused by the commutation is longer than that of the PWM control signal, the counter electromotive voltage output is at the H level while the PWM control signal is masked to be at the L level.

Although the above explanation has been made as to the case where the lower arm is switched, this also holds true for the case where the upper arm is switched. The comparator output 47 is designed to be turned ON or OFF under the PWM control after the zero-cross point and to become the H level when the enable signal 48 is applied to the logical operating means. As a result, the comparator output 47 is masked to be at the H level. Before the zero-cross point, the comparator output 47 remains the L level, so that it remains its L level even when the enable signal 48 is changed to the H level. In short, a fundamental output waveform when the upper arm is switched is exactly the same as that when the lower arm is switched.

In this way, the DC brushless motor is PWM-controlled in the sensorless mode by detecting the magnetic pole position. The rotor magnetic pole position detection device in the conventional DC brushless motor drive control apparatus under the PWM control will be further explained in more detail. The rotor magnetic pole position detection device in the conventional DC brushless motor drive control apparatus is disclosed in JP-A-5-91790 wherein the PWM control in which an upper arm is switched is performed.

FIG. 14 shows a conventional zero-cross point detection duration of an induced voltage when the PWM control is performed. In FIG. 14, reference numeral 50 denotes a delay time after the PWM control signal is turned ON until the induced voltage starts to be generated, 51 denotes a delay time after the PWM control signal is turned OFF until the induced voltage vanishes, 52 denotes a shift amount from the turning ON of the PWM control signal to the turning ON of the enable signal, 53 denotes a shift amount from the turning OFF of the PWM control signal to the turning OFF of the enable signal, and 56 denotes an attenuating vibration phenomenon. The prior art fails to disclose even a transient response and only describes only such a H level terminal voltage shown in FIG. 14. Although the vibration phenomenon to be inevitably generated is not illustrated in FIG. 14, the purpose in providing the delay times is to avoid the vibration phenomenon, so that a dashed line indicative of the attenuating vibration phenomenon 56 in FIG. 14 is added. For the purpose of setting a duration in which the induced voltage of the stationary winding can be reliably detected, the enable signal is set to be slightly narrower in the duration than an output duration of the induced voltage of the stationary winding, as shown in the same drawing. Thus, the enable signal is generated as follows. The enable signal has a start timing at which the delay time 52 slightly longer than the delay time 50 between the turning ON of the PWM control signal the start of the induced voltage generation elapses. Further, the enable signal has an end timing at which the delay time 53 slightly shorter than the delay time 51 between the turning OFF of the PWM control signal and the disappearance of the induced voltage elapses. In order to provide the delay time 52, a time constant circuit is provided for determining a time constant in an analog circuit.

When such a PWM control signal is input to the drive circuit (upper arm) and the delay time 50 elapses, the induced voltage becomes relatively stable to be at the H level. However, as shown by the dashed line in FIG. 14, when the PWM control signal is applied to the upper arm, on the other hand, a transient current flows through the flywheel diode to maintain the so-far counter electromotive voltage state during the delay time 50 and the attenuating vibration phenomenon 56 takes place at the head part of the induced voltage. When the terminal voltage in the vicinity of the reference voltage influences the output of the comparator, this transient vibration causes the detection failure of the zero-cross point, resulting in the erroneous commutation timing and leading to the cause of stepping-out of the motor. Further, this also causes the fluctuation of the detection timing, involving the increased vibration of the motor.

The conventional magnetic pole position detection device is required to monitor the output signal of the comparator according to the enable signal and not to detect the output signal during the OFF state of the PWM control signal (i.e., during the period in which the induced voltage of the stationary winding can not be detected). However, when logical operating means such as a micro-computer is controlled and uses the enable signal as an interrupt signal, the device must monitor the output signal of the comparator during all the H level state of the enable signal. As a result, the time of the logical operating means to be used for other purposes is decreased, thus reducing the utilization efficiency of the logical operating means.

In this way, in the above conventional DC brushless motor, as the delay time from the PWM control signal when the enable signal is turned ON is determined depending on a given time constant determined by an analog time constant circuit, a relationship between a load and the enable signal is poor. As a result, it has a problem that the attenuating vibration generated in the induced voltage of the stationary winding cannot be reliably avoided when the load is increased. Further, an analog circuit is required for determining a time constant for the delay time generation.

The conventional DC brushless motor also has the following problem when a micro-computer is used as the logical operating means of the magnetic pole position detection device and the enable signal is used as the interrupt signal. During the period in which the enable signal is in the ON state, a zero-cross point can be obtained as the comparison result between the induced voltage of the stationary winding and the reference voltage. As a result, the logical operating means cannot be effectively used for other operations during the period.

SUMMARY OF THE INVENTION

It is therefore an object of the present invention to provide a rotor magnetic pole position detection device which can solve the above problems in the prior art and, even when intermittently supplying a drive voltage to a stationary winding under control of a PWM control signal, which can compare an induced voltage of the stationary winding with a reference voltage to detect a zero-cross point in the induced voltage and which can reliably avoid the influences of a vibration waveform appearing in the induced voltage with use of a simple arrangement.

Another object of the present invention is to provide a rotor magnetic pole position detection device which can increase an operating efficiency in a micro-computer when the micro-computer is used as logical operating means.

In order to achieve the above objects, according to a first aspect of the present invention, there is provided a rotor magnetic pole position detection device which detects a zero-cross point in a induced voltage induced in a stationary winding under a PWM control, and is used in a DC brushless motor drive control apparatus to be driven in a sensorless mode, and which comprises:

a detection circuit for detecting terminal voltages of a plurality of stationary windings;

a reference voltage generation circuit for generating a reference voltage;

comparison means for comparing the terminal voltages with the reference voltage;

speed command voltage generation means for generating a PWM ON-width control signal;

PWM control signal generation means for generating a PWM control signal having a duty ratio corresponding to the PWM ON-width control signal;

logical operating means for obtaining a phase signal from a signal from the comparison means and for outputting an energization timing signal based on the phase signal and the PWM control signal; and a driver circuit for energizing the stationary windings based on the energization timing signal, wherein the logical operating means detects whether or not the induced voltage of each of the stationary windings is zero-crossed at a rising or falling edge of a triangle wave generation clock for generating the PWM control signal.

As a result, even when a drive voltage is intermittently supplied to the stationary windings under control of the PWM control signal in a drive mode, it is possible to detect the zero-cross point in the induced voltage by comparing the induced voltages of the stationary windings with the reference voltage. Further, it is possible to reliably avoid the influence of the attenuating vibration waveform at the transient response time which simply appears in the induced voltage.

According to a second aspect of the present invention, there is provided a rotor magnetic pole position detection device of the first aspect, in which the logical operating means detects whether or not the induced voltage of each of the stationary windings is zero-crossed after elapsing a vibratory phenomenon avoidance delay time after the rising or falling edge of the triangle wave generation clock, in stead of detecting whether or not the induced voltage of each of the stationary windings is zero-crossed at the rising or falling edge of the triangle wave generation clock.

As a result, it is possible to delay the influence of the attenuating vibration waveform at the transient response time, which appears in the induced voltage, by the vibratory phenomenon avoidance delay time to avoid it. Further, it is possible to perform the detection even when the ON width of the PWM control signal is small.

According to a third aspect of the present invention, there is provided a rotor magnetic pole position detection device of the first or second aspect, which further comprises enable signal generation means for generating an enable signal which permits a detection of the zero-cross point, wherein the enable signal is turned ON at the rising or falling edge of the triangle wave generation clock, and is turned OFF immediately before the PWM control signal is turned OFF; and the logical operating means detects whether or not the induced voltage of each of the stationary windings is zero-crossed only during a period in which the enable signal is in an ON state.

As a result, even when the ON width (duty ratio) of the PWM control signal is small, it is possible to delay the detection time after the rising or falling edge of the triangle wave generation clock using the enable signal to avoid the influence of the attenuating vibration waveform in the induced voltage of the stationary windings. Further, even when the rotor rotates at a high speed, it is possible to reduce the detection delay because the detection duration using the enable signal is provided.

According to a fourth aspect of the present invention, there is provided a rotor magnetic pole position detection device of the third aspect, in which a vibratory phenomenon avoidance delay time is counted by a counter; and when the counter counts out, the zero-cross point is detected.

As a result, it is possible to set and change the vibratory phenomenon avoidance delay time digitally and simply to set it with a high flexibility and to increase the utilization efficiency of the logical operating means.

According to a fifth aspect of the present invention, there is provided a rotor magnetic pole position detection device of the fourth aspect, in which the logical operating means is interrupted by the enable signal; and the vibratory phenomenon avoidance delay time is counted by the counter.

As a result, it possible to use the enable signal as the interrupt timing signal.

According to a sixth aspect of the present invention, there is provided a rotor magnetic pole position detection device of the fourth aspect, in which the counter is an up-down counter; and the up-down counter counts down after counting up and detects the zero-cross point when reaching a count-down carry.

As a result, a logical "AND" operation is performed over two conditions that the counter reaches the carry and that the enable signal is in the ON state, so that it is possible to carry out the control easily and accurately.

According to a seventh aspect of the present invention, there is provided a rotor magnetic pole position detection device of any of the third to sixth aspects, in which a switching element is turned OFF after elapsing a predetermined duration from a falling edge of the PWM control signal; and the logical operating means detects whether or not the induced voltage of each of the stationary windings is zero-crossed after elapsing the vibratory phenomenon avoidance delay time from the rising or falling edge of the triangle wave generation clock for generating the PWM control signal.

As a result, it is possible to delay the turning OFF of the switching element and it is possible to prolong the ON times of the PWM control signal and enable signal with the maximum utilization. Further, it is possible to prolong the vibratory phenomenon avoidance delay time. Accordingly, the influence of the attenuating vibration waveform at the time of the transient response appearing in the induced voltage can be avoided more reliably.

According to an eighth aspect of the present invention, there is provided a rotor magnetic pole position detection device of the sixth aspect, in which the vibratory phenomenon avoidance delay time is set equal to an ON time duration of the enable signal; and the logical operating means detects whether or not the induced voltage of each of the stationary windings is zero-crossed at a falling edge of the enable signal.

As a result, it is possible to prolong the vibratory phenomenon avoidance delay time to the maximum, and it is possible to delay the detection time to the maximum width of the enable signal. Thereby, the influence of the attenuating vibration waveform in the induced voltage can be highly avoided.

According to a ninth aspect of the present invention, there is provided a rotor magnetic pole position detection device of the fourth aspect, in which the logical operating means detects a zero cross by generating the enable signal when the counter counts about ½ of an ON time of the PWM control signal, in stead of turning ON the enable signal at the rising or falling edge of the triangle wave generation clock.

As a result, it is possible to prolong the vibratory phenomenon avoidance delay time to the maximum, and it is possible to delay the detection time to the maximum width of the enable signal. Thereby, the influence of the attenuating vibration waveform in the induced voltage can be highly avoided.

DESCRIPTION OF THE PREFERRED EMBODIMENTS (First Embodiment)

Embodiments of the present invention will be explained with reference to FIGS. 1–11.

Figure 1:
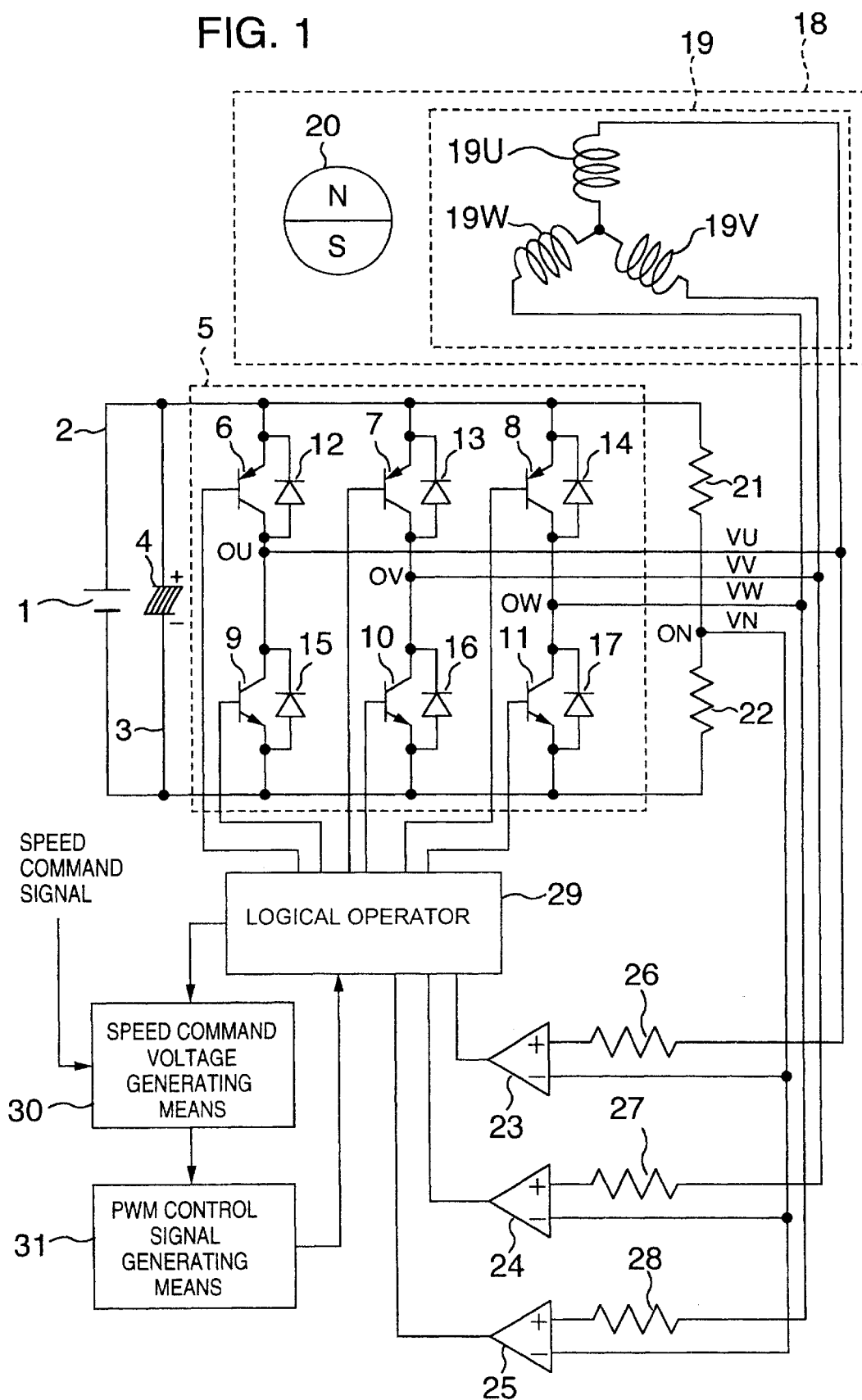
FIG. 1 is a general arrangement of a DC brushless motor drive control apparatus to be driven in the sensorless mode according to first and second embodiments of the present invention.
Figure 2:
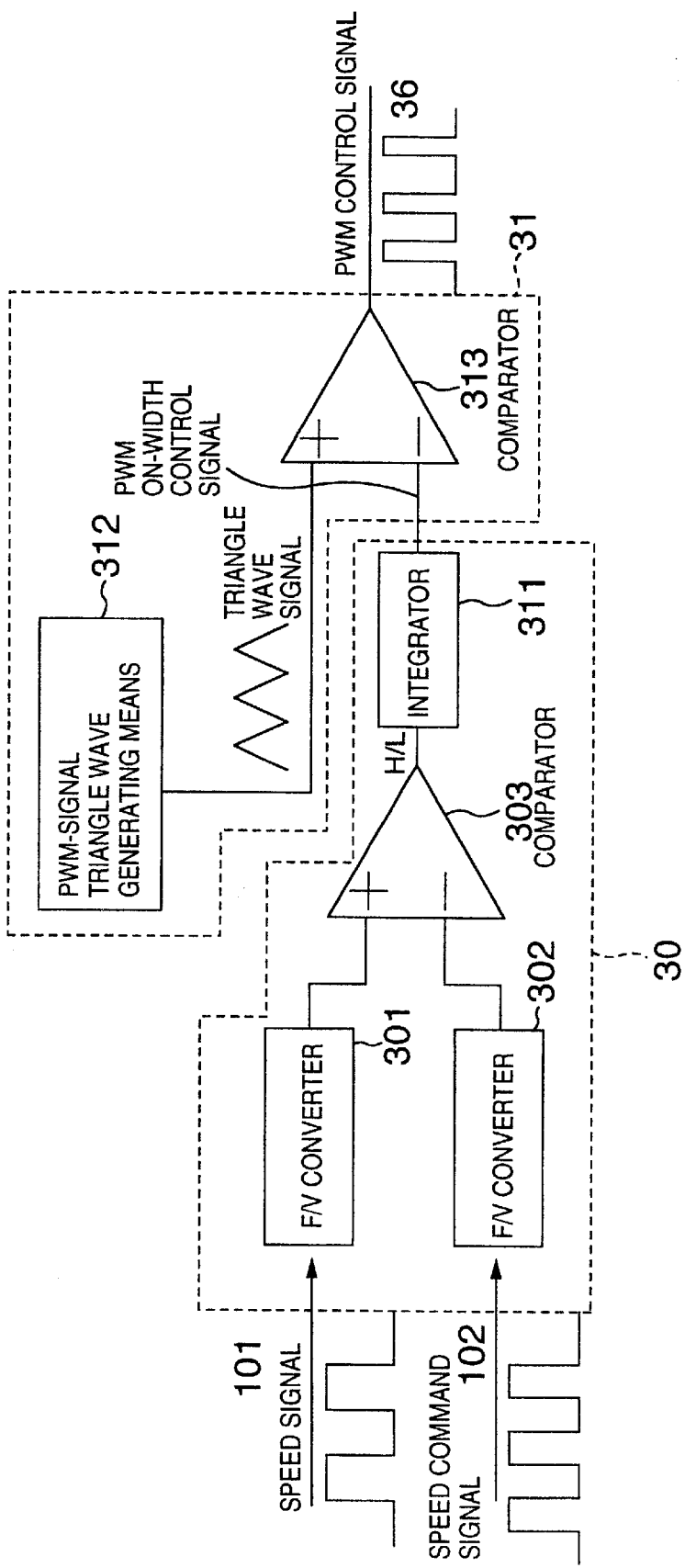
FIG. 2 is a zero-cross point extraction timing generator in the first embodiment of the present invention.
Figure 3A:
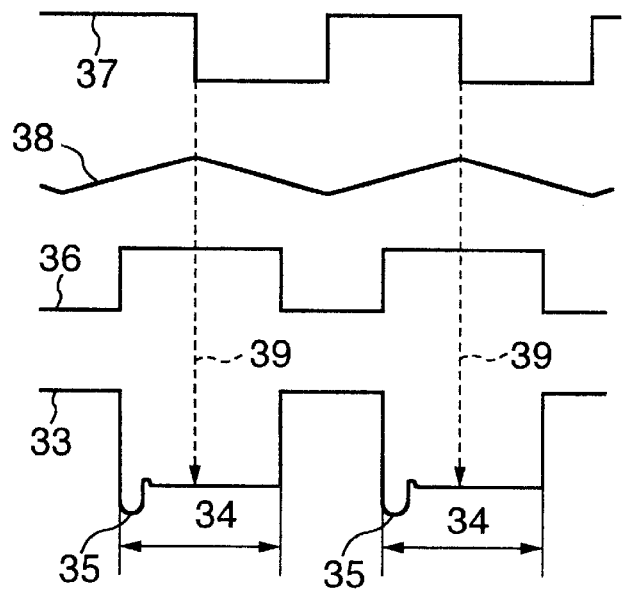
FIG. 3A is a zero-cross point extraction timing chart for explaining the detection of a zero-cross point at a falling edge of a triangle wave generation clock for generating a PWM control signal in the first embodiment of the present invention.
Figure 3B:
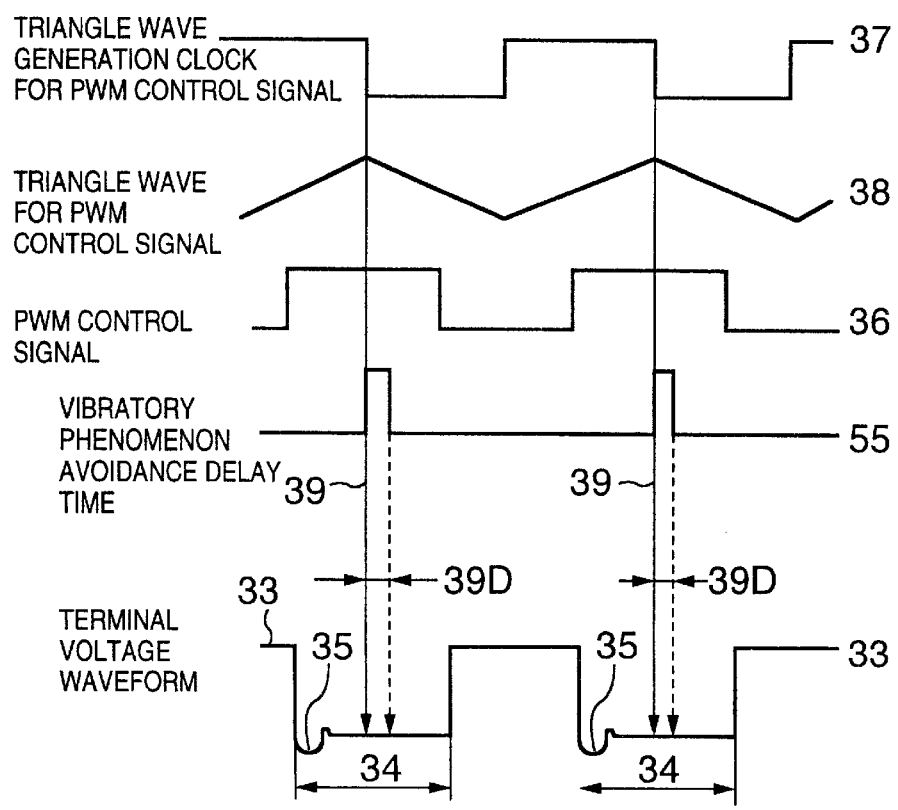
FIG. 3B is a zero-cross point extraction timing chart for explaining the detection of the zero-cross point after elapsing a vibration phenomenon avoidance delay time from the falling edge of the triangle wave generation clock for generating the PWM control signal in the first embodiment of the present invention.
Figure 4:
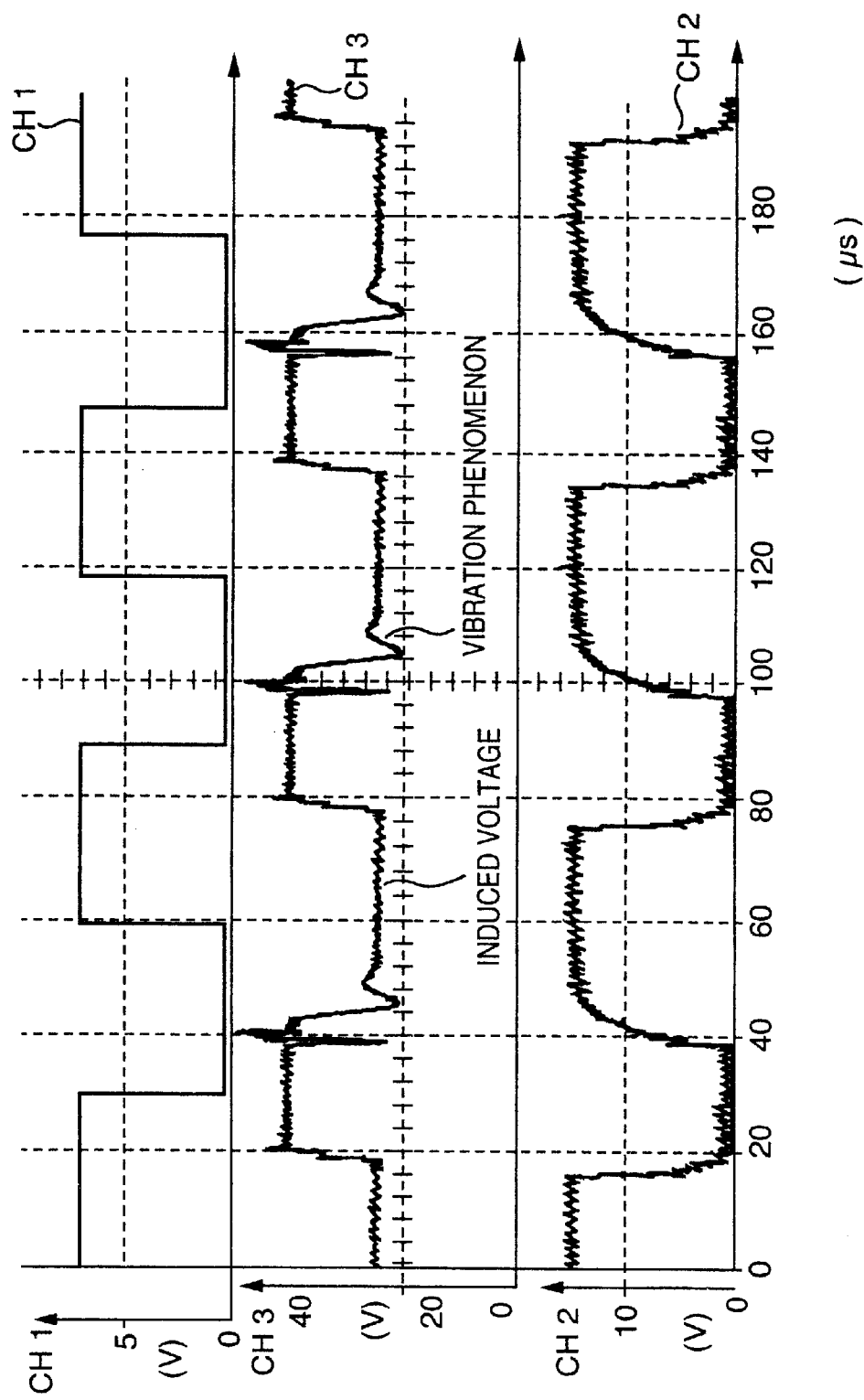
FIG. 4 is an actually-measured zero-cross point extraction timing chart in the second embodiment of the present invention.

Referring first to FIG. 1, there is shown a general arrangement of a DC brushless motor drive control apparatus to be driven in the sensorless mode according to the first and second embodiments of the present invention. FIG. 2 shows a zero-cross point extraction timing generator in the first embodiment of the present invention. FIG. 3A is a zero-cross point extraction timing chart for explaining the detection of a zero-cross at a falling edge of a triangle wave generation clock for generating a PWM control signal in the first embodiment of the present invention. FIG. 3B is a zero-cross point extraction timing chart for explaining the detection of the zero-cross after elapsing a vibration phenomenon avoidance delay time from the falling edge of the triangle wave generation clock for generating the PWM control signal in the first embodiment of the present invention. FIG. 4 is an actually-measured zero-cross point extraction timing chart in the second embodiment of the present invention.

In FIG. 1, reference numeral 1 denotes a DC power source, 2 and 3 denote buses, 4 denotes a capacitor for smoothing a DC current, and 5 denotes a driver circuit as output means. The driver circuit 5 includes PNP-type transistors 6, 7 and 8 and NPN-type transistors 9, 10 and 11 as switching elements, and flywheel diodes 12–17 connected in parallel with the transistors. Reference numeral 18 denotes a brushless motor of a plurality of phases. In the illustrated example, the brushless motor 18 has a stator 19 with stator coils 19U, 19V and 19W of three phases U, V and W, and a rotor 20 of a permanent magnet. The stator coils 19U, 19V and 19W are commonly connected at their one ends, and connected at the other ends to an output terminal OU as a common connection point between the transistors 6 and 9, to an output terminal OV as a common connection point between the transistors 7 and 10, and to an output terminal OW as a common connection point between the transistors 8 and 11, respectively. Reference numerals 21 and 22 denote resistors connected in series between the buses 2 and 3. A detection terminal ON as a common connection point between the resistors is arranged to output as a reference voltage a voltage VN at a virtual neutral point of ½ of a power voltage of the DC power source 1, corresponding to a voltage at a neutral point of the stator coils 19U, 19V and 19W. Reference numerals 23, 24 and 25 denote comparators which are connected at their non-inverted input terminals (+) to the output terminals OU, OV and OW through resistors 26, 27 and 28 respectively, and connected at their inverted input terminals (−) to the detection terminal ON. The output terminals of the comparators 23, 24 and 25 are connected to the input terminals of logical operating means 29. The phase signals of the brushless motor 18 from the comparators 23, 24 and 25 are input to the logical operating means 29. The output terminals of the logical operating means 29, on the other hand, are connected to the bases of the transistors 6–11. Reference numeral 30 denotes speed command voltage generating means for generating an PWM ON-width control signal to determine an ON width of PWM based on a speed detection signal indicative of a rotational speed of the motor received at the one input terminal from the logical operating means 29 and a speed command signal received at the other input terminal. Reference numeral 31 denotes PWM control signal generating means for generating a PWM control signal having a duty ratio corresponding to the ON-width control signal of PWM based on a triangle wave and the ON-width control signal of PWM. An energization timing signal corresponding to a superposition of the gate signals for driving the transistors 6–11 and a PWM control signal 36 is input as the base signals to the base terminals of ones of the transistors 6–11 belonging to the upper or lower arm. Thereby, it is possible to drive in the brushless mode of the DC motor based on the superposed PWM control.

FIG. 2 shows the details of the speed command voltage generating means 30 and PWM control signal generating means 31 which form a zero-cross point extraction timing generator in the first embodiment of the present invention. In FIG. 2, reference numeral 101 denotes a speed signal input from the logical operating means 29, and 102 denotes a speed command signal input from a load of the motor such as a pump. In the first embodiment, the speed signal 101 and the speed command signal 102 are input each in the form of a rectangular wave pulse having one period of an electrical angle of 360 degrees proportional to the rotational speed. Reference numeral 301 denotes an F/V converter for generating an analog voltage proportional to the frequency of the rectangular wave pulse of the speed signal, and 302 denotes an F/V converter for generating an analog voltage proportional to the frequency of the rectangular wave pulse of the speed command signal. Reference numeral 303 denotes a comparator for receiving the output signals of the F/V converters 301 and 302 at its input terminals (+) and (−), 311 denotes an integrator for integrating the output of the comparator 303, 312 denotes triangle wave generating means for the PWM signal, and 313 denotes a comparator connected at its one terminal to the output of the integrator 311 and also connected at its (+) terminal to the PWM-signal triangle wave generating means 312. The comparator 313 outputs the PWM control signal 36. The F/V converters 301 and 302, the comparator 303 and the integrator 311 form the speed command voltage generating means 30. The PWM-signal triangle wave generating means 312 and the comparator 313 form the PWM control signal generating means 31.

When the frequency of the speed command signal 102 is smaller than that of the speed signal 101, the comparator 303 outputs a H level signal. When the frequency of the speed command signal 102 is larger than that of the speed signal 101, the comparator 303 outputs a L level signal. The output signal remains the H or L level even after passed through the integrator 311. The output of the integrator 311 is used as a reference voltage for comparison with the triangle wave for the PWM signal generated by the PWM-signal triangle wave generating means 312. When the output of the integrator 311 has a L level, the output signal of the comparator 313 has an H level and is used as the PWM control signal 36 having a duty ratio of 100%. In other words, the frequency of the speed signal 101 is smaller than that of the speed command signal 102 at the time of starting with a large load, so that the duty ratio becomes large and the output of the motor becomes large. When the motor is continuously driven under such a condition, the speed signal 101 gradually increases and the output of the integrator 311 gradually increases from its L level according to a time constant of the integrator 311. In response to it, the PWM control signal 36 becomes small in its duty ratio, and the motor output also decreases. In this manner, the frequency of the speed signal 101 becomes equal to that of the speed command signal 102.

When the output of the integrator 311 has a H level, the output signal of the comparator 313 has a L level, so that the PWM control signal 36 has a duty ratio of 0%. That is, when the load is small, the frequency of the speed signal is larger than that of the speed command signal, so that the duty ratio becomes small and the motor output becomes also small. When the motor is continuously driven under such a condition, the speed signal gradually decreases and the output of the integrator 311 gradually decreases from a H level according to the time constant of the integrator 311. In response to it, the duty ratio of the PWM control signal 36 becomes large, increasing the motor output. In this manner, the frequency of the speed signal 101 becomes equal to that of the speed command signal 102.

Explanation will next be made as to the zero-cross point extraction timing by referring to FIGS. 3A and 3B. In FIGS. 3A and 3B, reference numeral 37 denotes a triangle wave generation clock which is a rectangular wave pulse having a duty ratio of 50%. A PWM control signal generation triangle wave 38 which is generated based on the triangle wave generation clock 37 has an apex or mountain top point of the triangle at a falling edge of the triangle wave generation clock 37 and has a mountain valley point of the triangle at a rising edge thereof. The comparator 313 compares the PWM control signal generation triangle wave 38 with the reference voltage received from the integrator 311 to generate the PWM control signal 36. The PWM control signal 36 is a rectangular wave pulse which has a H level higher than the reference voltage at the mountain top of the PWM control signal generation triangle wave 38. Reference numeral 39 denotes a falling position of the triangle wave generation clock 37. Reference numeral 39D denotes a vibratory phenomenon avoidance delay time, and reference numeral 33 denotes a terminal voltage waveform.

In the illustrated terminal voltage waveform 33, a transient vibratory phenomenon 35 takes place immediately after a falling edge of the counter electromotive voltage, followed by an induced voltage generated after the transient response. Accordingly, in order to extract the zero-cross point stably and reliably, a point of the induced voltage generated after the vibratory phenomenon 35 must be extracted as the zero-cross point. As has been already mentioned above, the vibratory phenomenon 35 of the transient response is basically determined by the time constant of a driver circuit. However, the inventor of the present application has found that, even when the frequency of the speed signal becomes larger than that of the speed command signal and the duty ratio becomes considerably small, the vibratory phenomenon 35 usually gets steady in one period and such great vibration as to exceed a middle point of the rectangular wave pulse (ON width) of the comparator 303 will not take place. In short, the vibratory phenomenon 35 gets steady within at most one period and thus becomes independent of the duty ratio. For this reason, in the first embodiment, as the middle point of the rectangular wave pulse (ON width) corresponds to the falling edge of the triangle wave generation clock 37, the zero-cross point extraction is carried out at the falling position 39. In the case of a high load tending to cause stepping out of the motor, the ON width of the PWM control signal 36 becomes large and thus a time length until the vibration becomes steady becomes long. In this case, however, the falling position 39 is also delayed, so that this will not influence the zero-cross point extraction.

The first embodiment has been explained in connection with the case of the zero-cross point extraction at the falling edge of the triangle wave generation clock. FIG. 4 shows actually-measured waveforms of voltages wherein the zero-cross point is extracted at the rising edge of the triangle wave generation clock. However, a difference between the zero-cross point extractions at the falling and rising edges lies only in the fact that one triangle wave generation clocks (H–L) corresponds to an inversion of the other, and the both zero-cross point extractions are carried out both at the middle point of the rectangular wave pulse (ON width) of the comparator 303. That is, from the viewpoint of the vibratory phenomenon avoidance, the first embodiment is basically the same as the second embodiment. Therefore, explanation will be made as to how to avoid the vibratory phenomenon with reference to FIG. 4 showing the actually-measured waveforms in the second embodiment. In FIG. 4, reference numeral CH1 denotes an actually-measured waveform of a triangle wave generation clock for generating a PWM control signal, CH2 denotes an actually-measured waveform of a gate signal in a lower arm driven by the PWM control signal, and CH3 denotes an actually-measured waveform of a terminal voltage. As shown by CH3, the terminal voltage has a vibratory phenomenon indicative of the aforementioned transient response, an induced voltage generation duration, and a counter electromotive voltage generation duration. As will be seen from FIG. 4, the extraction timing of the induced voltage is carried out at the rising edge of the triangle wave generation clock for generating the PWM control signal, so that the vibratory phenomenon can be reliably avoided.

In usual cases, further, the zero-cross point extraction can be carried out at the falling edge of the triangle wave generation clock 37. However, for the purpose of increasing the reliability, the vibratory phenomenon avoidance delay time 39D may be provided after the falling edge of the triangle wave generation clock 37 as shown in FIG. 3B. In the latter case, the extraction can be carried out at the timing at which the vibratory phenomenon 35 gets steady completely, and the attenuating vibration caused in the induced voltage of the stationary winding can be reliably avoided in a simple manner. The pulse width of an extraction timing signal (not shown) is required to have such a value as to enough to execute interrupting operation to cause the logical operating means to perform the zero-cross point detection, and in this case, the time width is very small. When the extraction timing signal is applied to the logical operating means, the logical operating means detects the output of the comparator in the PWM control mode using the extraction timing signal as a trigger. As the vibratory phenomenon avoidance delay time 39D, it is only required to select a time width which is within a maximum time width from the falling edge point of the triangle wave generation clock 37 to the falling edge point of the PWM control signal 36. In this connection, it is preferable to use a logical circuit to calculate the above maximum time width, for example, by performing a logical "exclusive OR" operation of the triangle wave generation clock 37 and PWM control signal 36 to obtain an "exclusive OR" output and by performing a logical "AND" operation of the output and PWM control signal 36, and to calculate a time width corresponding to ½ of the maximum time width by frequency-dividing the calculated the maximum time width, and then to select it as the vibratory phenomenon avoidance delay time. This is suitable because the above calculation operation is not carried out by the micro-computer. The falling edge time point of the PWM control signal 36 may be set at the end time point of the vibratory phenomenon avoidance delay time 39D, depending on its applications.

In this way, the zero-cross point extraction is carried out with use of the logical circuits and so forth at the time point of the falling edge of the triangle wave generation clock 37 or at the time point of the end of elapse of the vibratory phenomenon avoidance delay time 39D as necessary. Therefore, the need for forming an enable signal 40 to monitor the output signal of the comparator during all time of the enable signal 40 at the H level as in the prior art can be eliminated. As a result, the micro-computer as the logical operating means 29 can be used for other purposes, so that the logical operating means 29 can have the large utilization efficiency.

(Second Embodiment)

Figure 5:
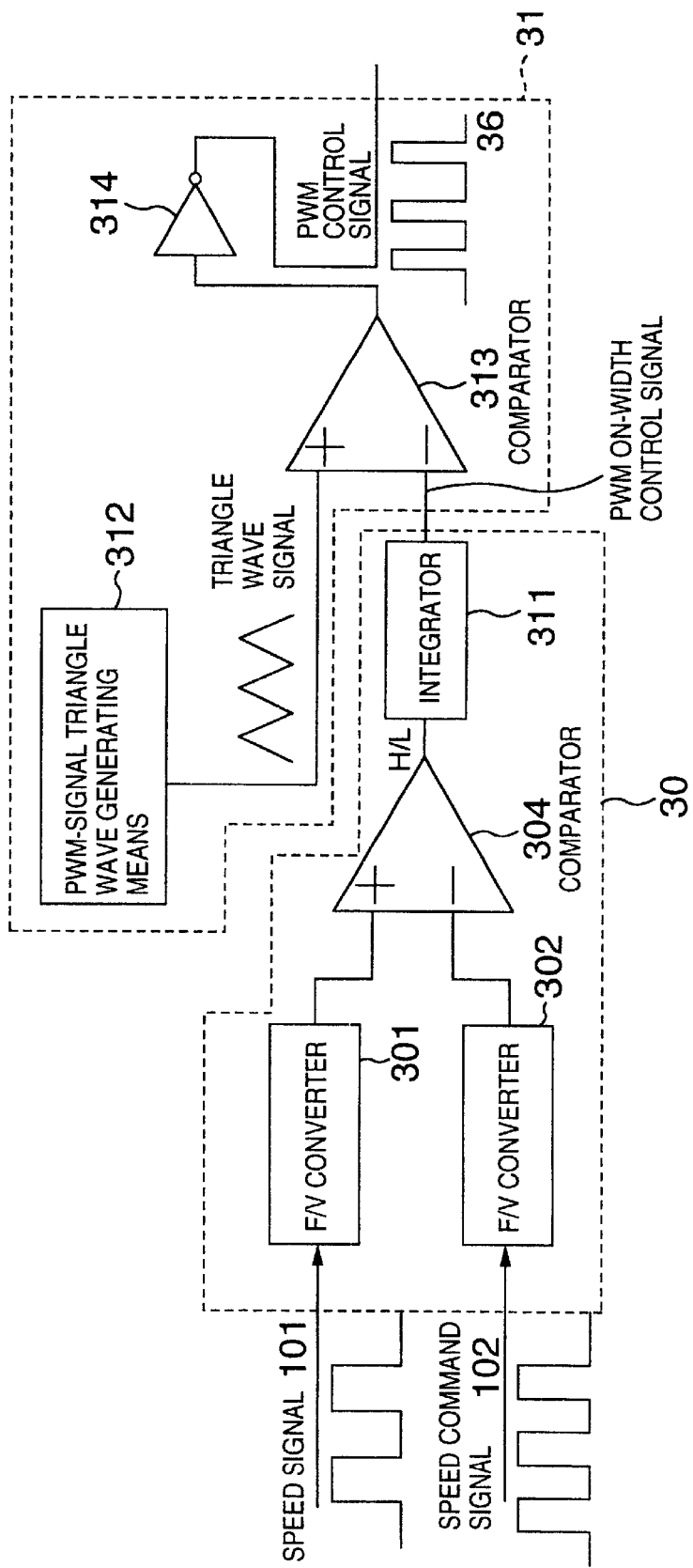
FIG. 5 shows a zero-cross point extraction timing generator in the second embodiment of the present invention.
Figure 6A:
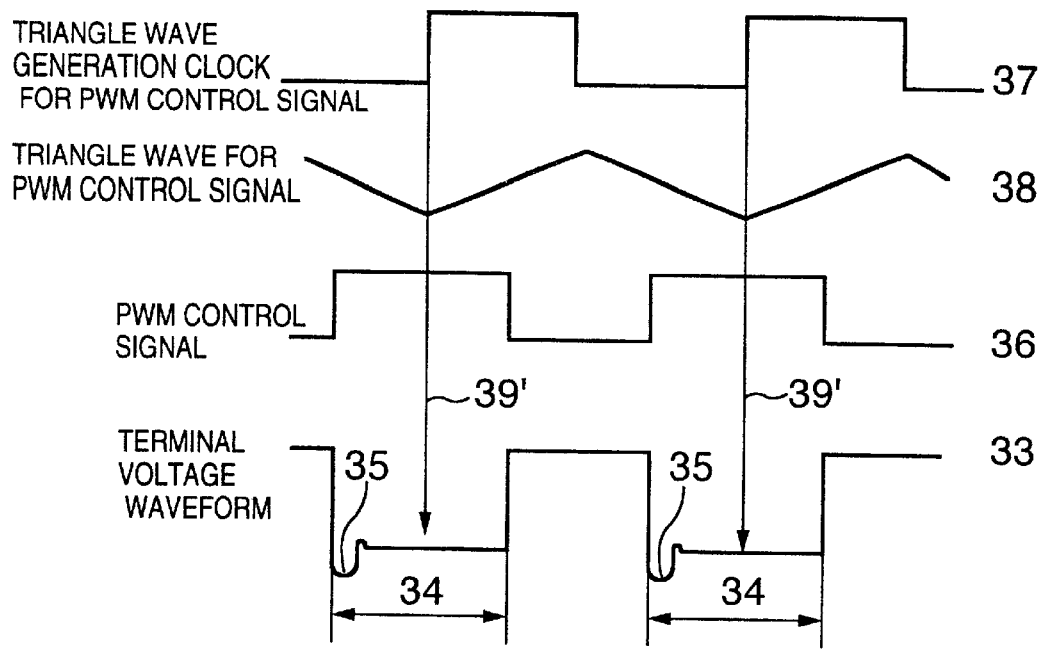
FIG. 6A is a zero-cross point extraction timing chart for explaining the detection of a zero-cross point at a falling edge of a triangle wave generation clock for generating a PWM control signal in the second embodiment of the present invention.
Figure 6B:
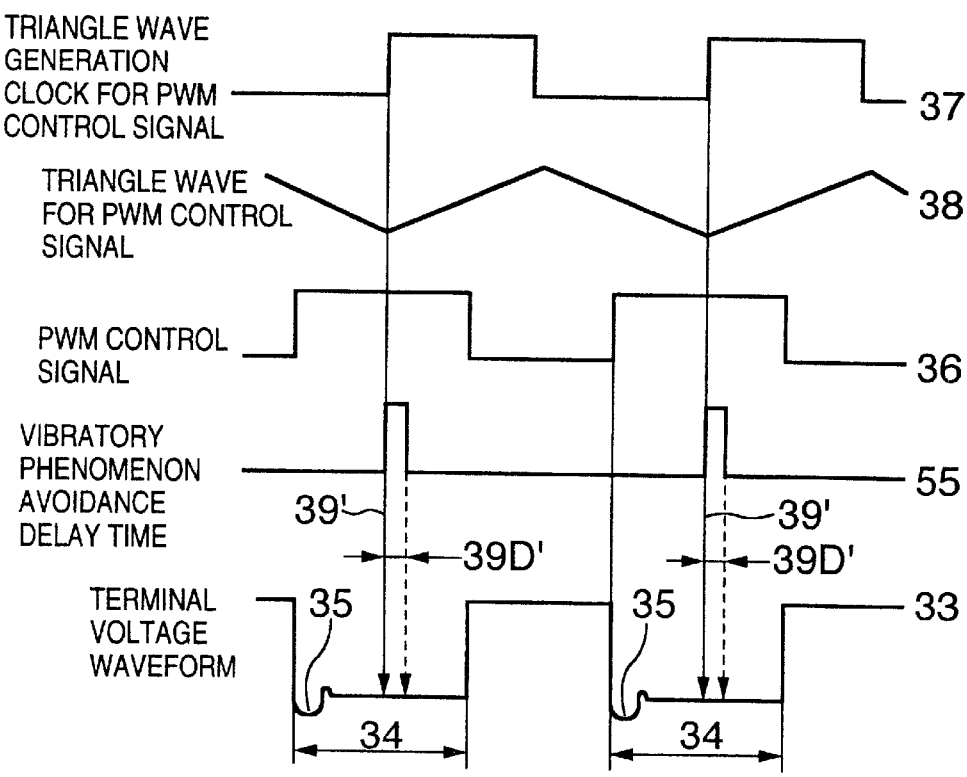
FIG. 6B is a zero-cross point extraction timing chart for explaining the detection of the zero-cross point after elapsing a vibration phenomenon avoidance delay time from the falling edge of the triangle wave generation clock for generating the PWM control signal in the second embodiment of the present invention.

FIG. 1 is a general arrangement of a DC brushless motor drive control apparatus to be driven in the sensorless mode according to the first and second embodiments of the present invention. FIG. 4 is an actually-measured zero-cross point extraction timing chart in the second embodiment of the present invention. FIG. 5 shows a zero-cross point extraction timing generator in the second embodiment of the present invention. FIG. 6A is a zero-cross point extraction timing chart for explaining the detection of a zero-cross point at a falling edge of a triangle wave generation clock for generating a PWM control signal in the second embodiment of the present invention. FIG. 6B is a zero-cross point extraction timing chart for explaining the detection of the zero-cross point after elapsing a vibration phenomenon avoidance delay time from the falling edge of the triangle wave generation clock for generating the PWM control signal in the second embodiment of the present invention. The DC brushless motor drive control apparatus of the second embodiment is substantially the same as that of the first embodiment, except that the zero-cross point extraction is carried out at a rising edge of a triangle wave generation clock for PWM control in the second embodiment. Accordingly, in the second embodiment, the parts common to the first embodiment are denoted by the same reference numerals, and the explanation thereof is omitted because it has been already explained in detail in the first embodiment.

In FIGS. 1, 5, 6A and 6B, reference numeral 101 denotes a speed signal, 102 denotes a speed command signal, 301 and 302 denote F/V converters, 304 denotes a comparator, 311 denotes an integrator, 312 denotes means for generating a triangle wave for a PWM signal, 313 denotes a comparator, and 36 denotes a PWM control signal. Reference numeral 314 denotes an inversion circuit for inverting an input signal to a H or L level signal. The F/V converters 301 and 302, the comparator 304 and the integrator 311 form the speed command voltage generating means 30 in the second embodiment. The PWM-signal triangle wave generating means 312, the comparator 313 and the inversion circuit 314 form the PWM control signal generating means 31 in the second embodiment.

In the second embodiment, the comparator 304 has the input terminals (+) and (−) opposite in polarity to those of the comparator 303 in the first embodiment. The output signal of the F/V converter 301 is connected to the terminal (−) of the comparator 304 and the output signal of the F/V converter 302 is connected to the input terminal (+) thereof. Accordingly, as opposed to the first embodiment, the output of the comparator 313 is of a rectangular wave pulse which has a L level lower than the reference voltage at the valley part of the PWM control signal generation triangle wave 38. The output of the comparator 313 is inverted by the inversion circuit 314 to generate a rectangular wave pulse having a H level at the valley part of the PWM control signal generation triangle wave 38. The inversion circuit 314 outputs the rectangular wave pulse as the PWM control signal 36. As shown in FIG. 6A, in the terminal voltage waveform 33, a transient vibratory phenomenon 35 takes place immediately after the falling edge of the counter electromotive voltage, followed by the induced voltage. The transient response will not continue to the middle point of the rectangular wave pulse of the PWM control signal 36. For this reason, in the second embodiment, from the viewpoint of the fact that the middle point of the rectangular wave pulse corresponds to the rising edge point of the triangle wave generation clock 37, the zero-cross point is extracted at the rising position 39'.

Also, similarly to the first embodiment, a vibratory phenomenon avoidance delay time 39'D may be provided after the falling edge of the triangle wave generation clock 37 as shown in FIG. 6B. A time point at which the vibratory phenomenon 35 becomes steady completely can be set at the zero-cross point extraction timing, so that the attenuating vibration caused in the induced voltage of the stationary winding can be reliably avoided. The pulse with of the extraction timing signal (not shown) is only required to be able to execute the interrupting operation for the logical operating means to perform the zero-cross point detection, and the pulse width is set to have a very small value. When the extraction timing signal is applied to the logical operating means, the logical operating means is triggered to detect the output signal of the comparator in the PWM control mode. How to select and generate the vibratory phenomenon avoidance delay time 39'D is substantially the same as that in the first embodiment.

The magnetic pole position detection device in the second embodiment has basically the same operation and effect as the first embodiment. Further, as the actually-measured waveforms in the second embodiment are ones shown in FIG. 4 and the explanation thereof has been already made in the first embodiment, it is omitted here.

(Third Embodiment)

Figure 7:
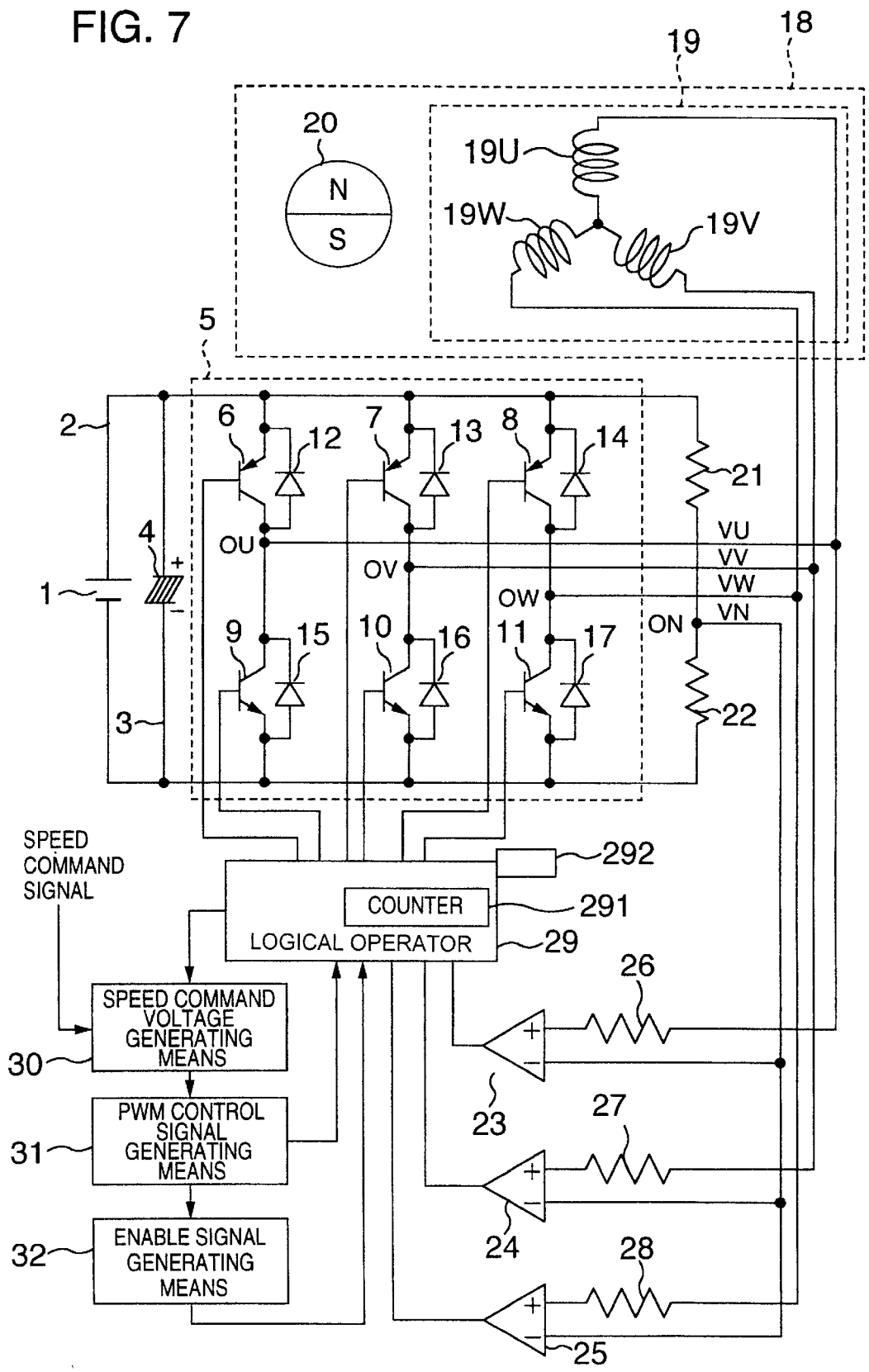
FIG. 7 is a general arrangement of a DC brushless motor drive control apparatus to be driven in the sensorless mode according to a third embodiment of the present invention.
Figure 8:
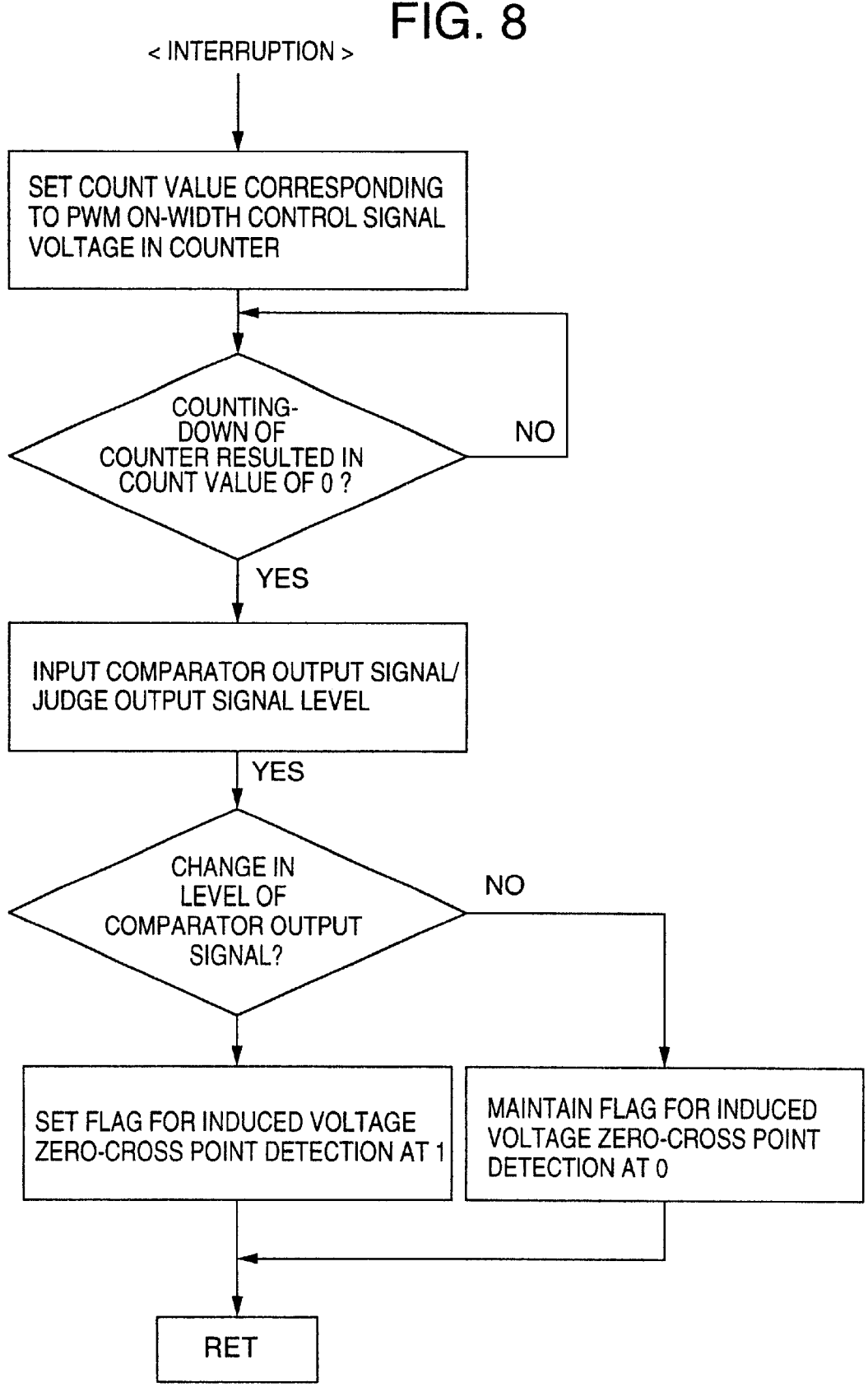
FIG. 8 is a flowchart for explaining an interrupting operation when a micro-computer is used as logical operating means of the DC brushless motor drive control apparatus.
Figure 9:
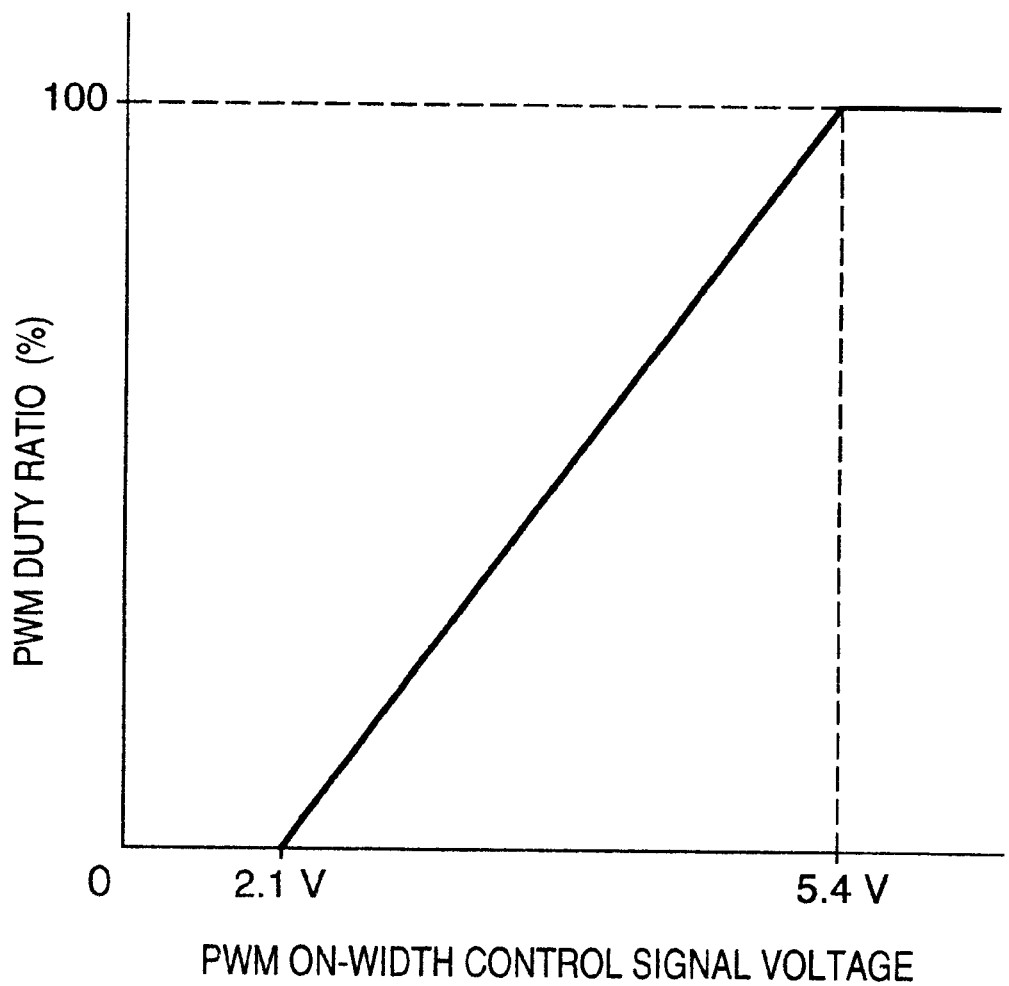
FIG. 9 is a diagram showing a relationship between a PWM duty ratio and an ON width control signal voltage for a PWM control as a reference to determine an ON width of the PWM signal in the first to third embodiments of the present invention.

FIG. 7 shows a general arrangement of a DC brushless motor drive control apparatus to be driven in the sensorless mode according to the third embodiment of the present invention. FIG. 8 is a flowchart for explaining an interrupting operation when a micro-computer is used as logical operating means of the DC brushless motor drive control apparatus. FIG. 9 is a diagram showing a relationship between a PWM duty ratio and an ON width control signal voltage for the PWM control as a reference to determine an ON width of the PWM signal in the first to third embodiments of the present invention. The DC brushless motor drive control apparatus of the third embodiment is substantially the same as that of the first or second embodiment, except that the zero-cross point extraction timing is calculated with use of a counter. Accordingly, in the third embodiment, the parts common to those in the first embodiment are denoted by the same reference numerals and the explanation thereof is omitted because the explanation has been already explained in detail in the first embodiment.

In FIG. 7, reference numeral 291 denotes a counter in which a count value calculated by the logical operating means 29 is set to count a zero-cross point extraction timing provided in the logical operating means 29, 292 denotes a flag changed from 0 to 1 when the output signals of the comparators 23–25 vary and a zero-cross point is detected after the counter 291 counts out, and 32 denotes enable signal generating means for generating an enable signal 40 which allows the detection of the zero-cross during only the period in which the induced voltage can be detected based on the PWM control signal and allows the interruption process to the logical operating means 29.

As shown in FIG. 9, an ON time of the PWM control signal 36 is uniquely determined by the voltage (reference voltage) of the ON-width control signal of the PWM control signal 36. A process of generating the PWM control signal is the same as that already explained in the first or second embodiment. That is, the PWM control signal generation triangle wave 38 generated by the PWM control signal generating means 31 is compared by the PWM control signal generating means 31 with the ON-width control signal voltage of the PWM control signal generated by the speed command voltage generating means 30 to generate the PWM control signal 36. The enable signal generating means 32 generates the enable signal 40 at the falling edge of the triangle wave generation clock 37, and the logical operating means 29 starts the detection of a zero-cross detection duration 41. As shown in FIG. 8, the interrupting operation is started based on the enable signal and the logical operating means 29 sets a next count value in the counter 291. That is, the count value is obtained by calculating ½ of a value obtained by dividing the ON time of the PWM control signal 36 by the clock period of the counter and then by rounding down its remainder. The counter 291 counts down to its count value of 0, at which time the logical operating means 29 receives the output signals of the comparators 23–25, which are the comparison means, to judge a level variation in the output signals. Accordingly, the level variation will be detected nearly at the end time point (falling edge) of the ON time of the PWM control signal. When the logical operating means 29 detects the level variation in the output signals of the comparators 23–25 as its judgement result, the means sets the flag 292 (sets "1") indicative of the detection or non-detection of the zero-cross point in the induced voltage and returns from the subroutine of the interrupting operation. No level variation in the output signals of the comparators 23–25 causes the logical operating means 29 to keep the flag indicative of the detection or non-detection of the induced voltage at "0" and to return from the subroutine.

In the second embodiment, although the count value is obtained by calculating ½ and rounding down its remainder, any value may be set so long as it is 1 or more and within a range of the calculated value or less. When a small value is employed as the count value, the zero-cross point is detected at a time point close to a time point of ½ of the ON time of the PWM control signal.

In this way, the zero-cross point is detected by interrupting at a time (at the falling edge of the triangle wave generation clock 37) corresponding to ½ of the ON time of the PWM control signal and then obtaining the zero-cross point extraction timing by counting the vibratory phenomenon avoidance delay time in the counter. Therefore, as the level variation in the output signal is judged at the time point corresponding at least to about ½ of the ON time as in the first or second embodiment, the influence of the transient response of the PWM control by the vibratory phenomenon 35 can be removed. Further, as the setting of the flag 292 at "1" means that the waveform is zero-crossed, this can be utilized in the driving control of the motor. When the count value obtained by calculating ½ and rounding down its remainder is employed, the level variation is detected nearly at the end time point (at the falling edge) of the ON time of the PWM control signal, so that the vibration avoidance can be achieved highly effectively.

Although the count is performed using the enable signal as the interrupt signal in the third embodiment described above, there are also a method in which the enable signal is not used as the interrupt signal. That is, an up-down counter is used as the counter. At the rising edge of the PWM control signal 36, the ON time of the PWM control signal 36 is divided by the clock period of the up-down counter and then ½ of the obtained value is calculated. A value smaller than an integer obtained by rounding down the remainder of the calculated value is set as the count value to start the count is started. Thereby, the vibratory phenomenon avoidance delay time is counted. The count value is set in the up-down counter, the up-down counter sequentially counts up the value. Once the counter reaches a count-up carry, the counter is switched to its count-down mode. Thereafter, under conditions that the enable signal is ON and the counter reaches a count-down carry, the detection of a zero-cross point is carried out at the time point of the count-out.

Explanation will be made in more detail as to the above method of setting the value smaller than the value obtained by calculating ½ of the ON time and rounding down its remainder. For a value is obtained by calculating ½ of a value obtained by dividing the ON time of the PWM control signal 36 by the clock period of the counter and then by rounding down its remainder, a value obtained by multiplying the obtained value by a preset coefficient not smaller than ½ and not larger than 1 (e.g., 0.9) and then by dropping the fractional portion of the number is used as the count value. Alternatively, a value obtained by dividing the ON time of the PWM control signal 36 by the clock period of the counter and then by multiplying the divided value by a preset coefficient not smaller than ¼ and not larger than ½ (e.g., 0.45) and dropping the fractional portion of the number may be used as the count value. By suitably selecting the preset coefficient, the vibratory phenomenon avoidance delay time can be freely set. For example, when the count value is set at its maximum, the zero-cross point detection is carried out nearly at the end time point of the ON time of the PWM control signal. Whereas, when the count value is set at its minimum, the zero-cross point detection is carried out at the time point corresponding to nearly ½ of the ON time of the PWM control signal.

A modification of the magnetic pole position detection device of the third embodiment using the up-down counter and the enable signal as mentioned above is as follows. A value is obtained by calculating ½ of a value obtained by dividing the ON time of the PWM control signal 36 by the clock period of the counter and then by rounding down its remainder is set in the counter. When the counter performs its count-up operation and reaches a count-up carry, the carry is used to cause the enable signal generation means to generate an enable signal as the interrupt signal. Even in this case, as in the first and second embodiments, the interruption is applied at the time point corresponding to ½ of the ON time of the PWM control signal 36 to detect the zero-cross point.

In this way, as the rotor magnetic pole position detection device of the third embodiment can select the vibration avoidance delay time by the counter 291 relatively freely, the device can highly easily cope with any load (PWM control duty ratio).

(Fourth Embodiment)

Figure 10:
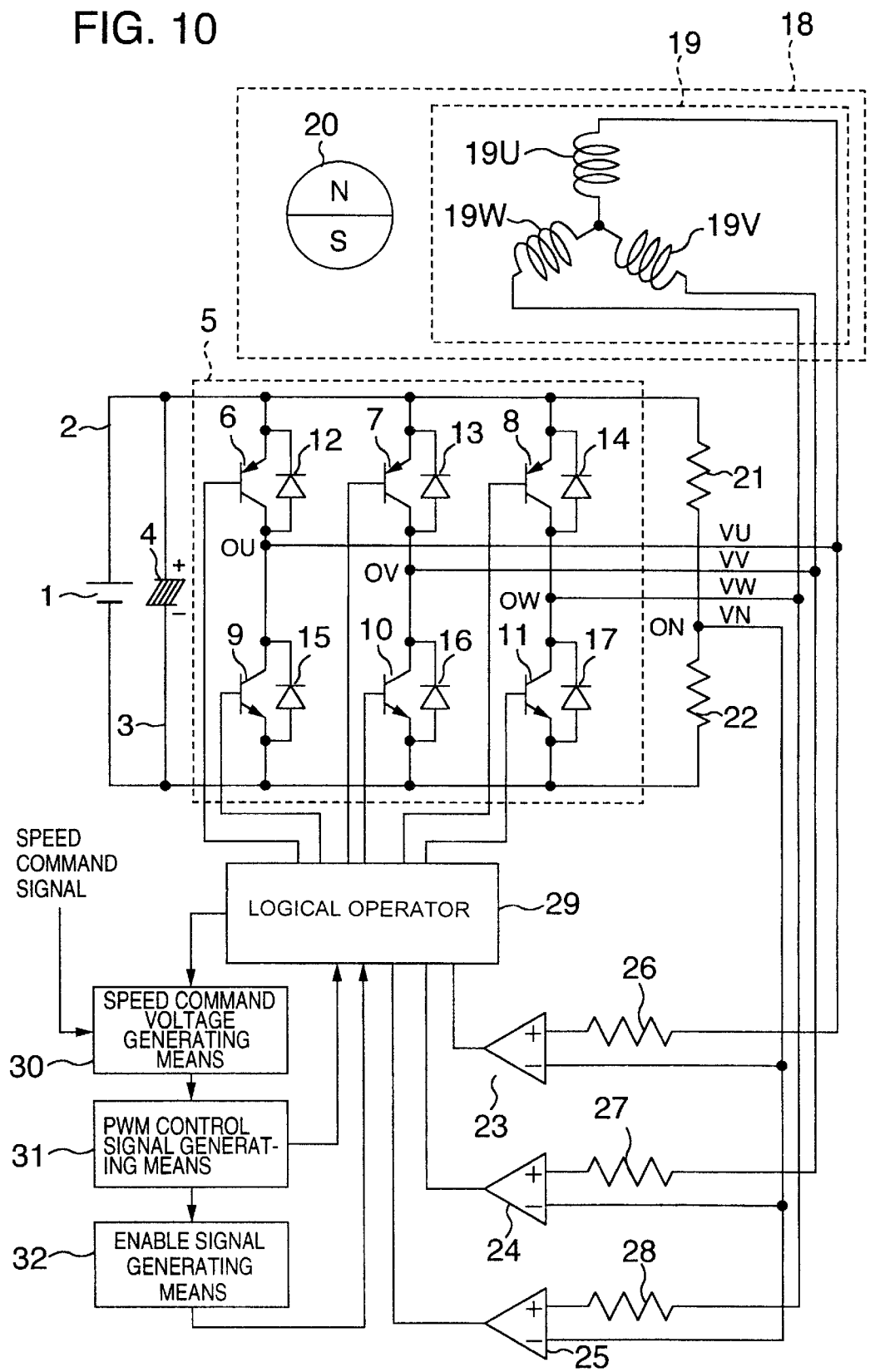
FIG. 10 is a general arrangement of a DC brushless motor drive control apparatus to be driven in the sensorless mode according to a fourth embodiment of the present invention.
Figure 11:
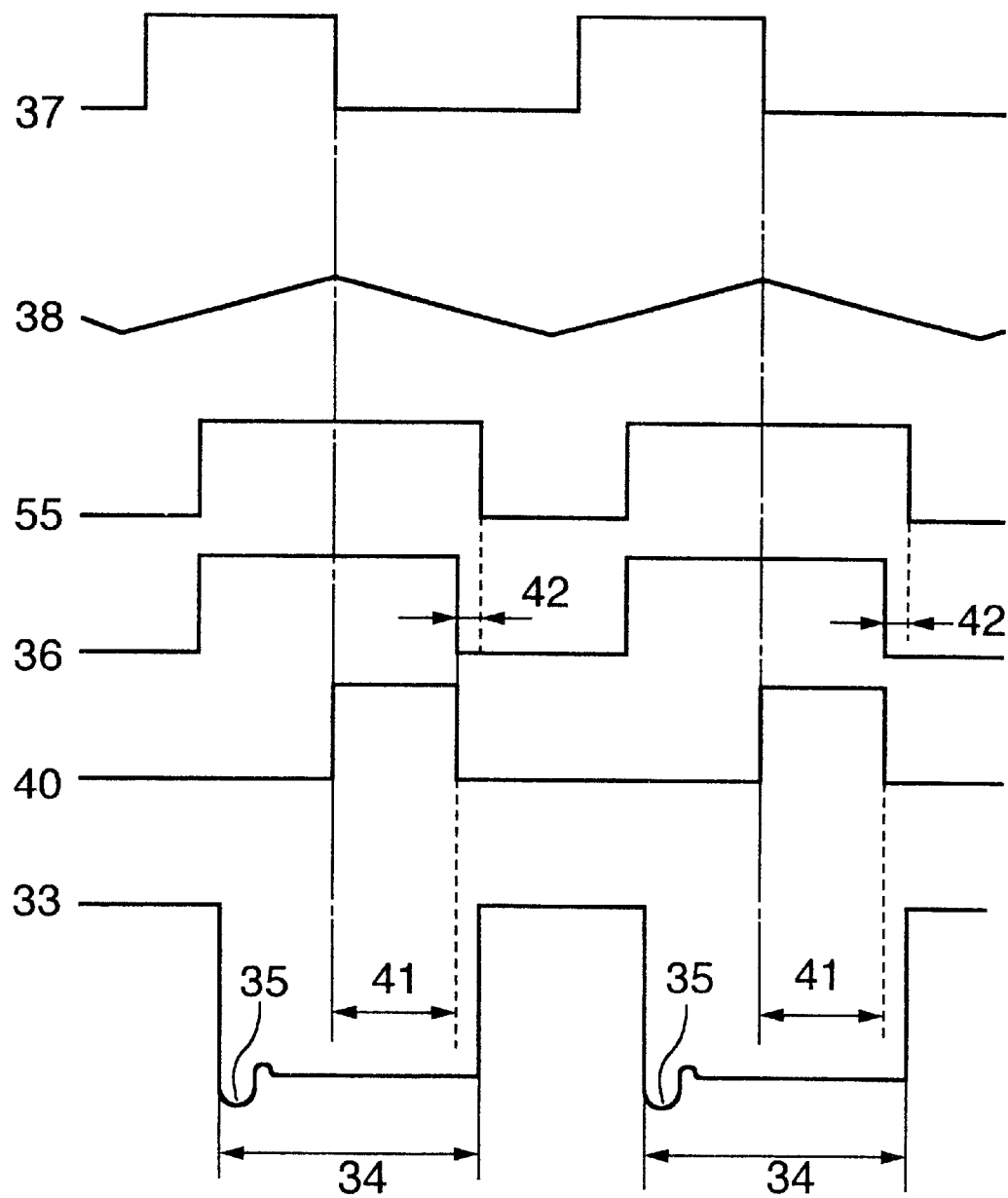
FIG. 11 is a diagram for explaining a method for detecting a zero-cross in the induced voltage in the DC brushless motor drive control apparatus in the third embodiment of the present invention.
Figure 12:
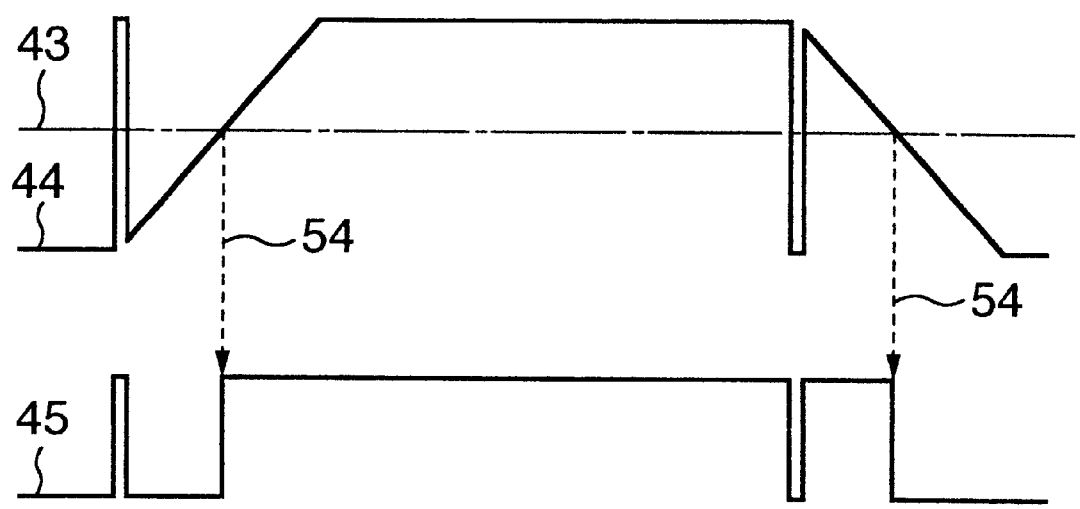
FIG. 12 shows waveforms of voltages corresponding one phase when the PWM control is not applied in the prior art.
Figure 13A:
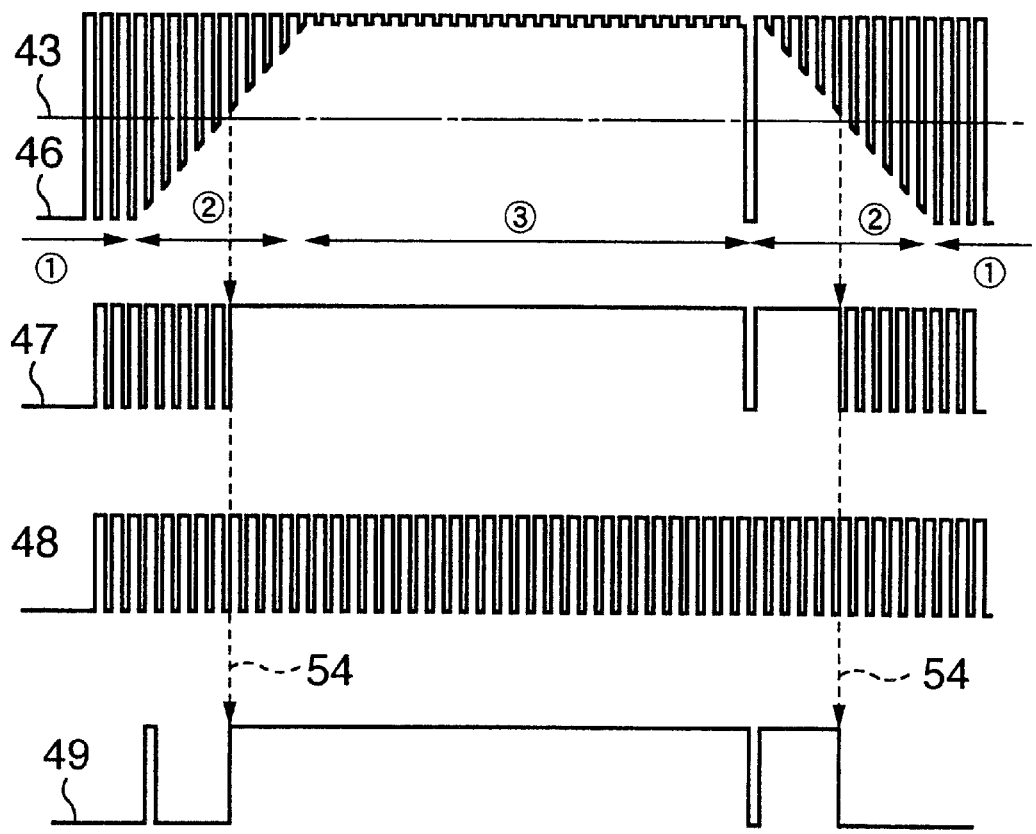
FIG. 13A shows waveforms of voltages corresponding one phase when a lower arm is switched for the PWM control in the prior art and waveforms of voltages under the PWM control.
Figure 13B:
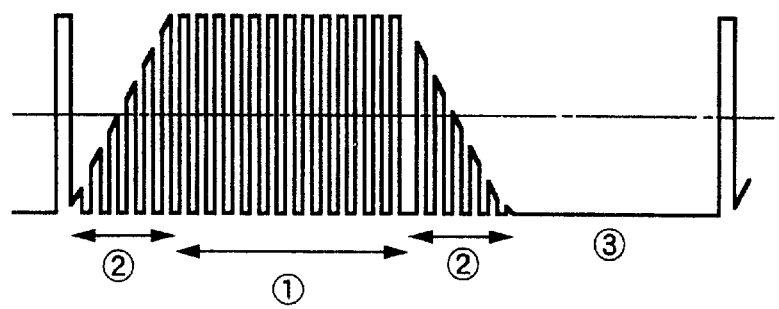
FIG. 13B shows waveforms of voltages corresponding one phase when an upper arm is switched for the PWM control in the prior art and waveforms of voltages under the PWM control.
Figure 14:
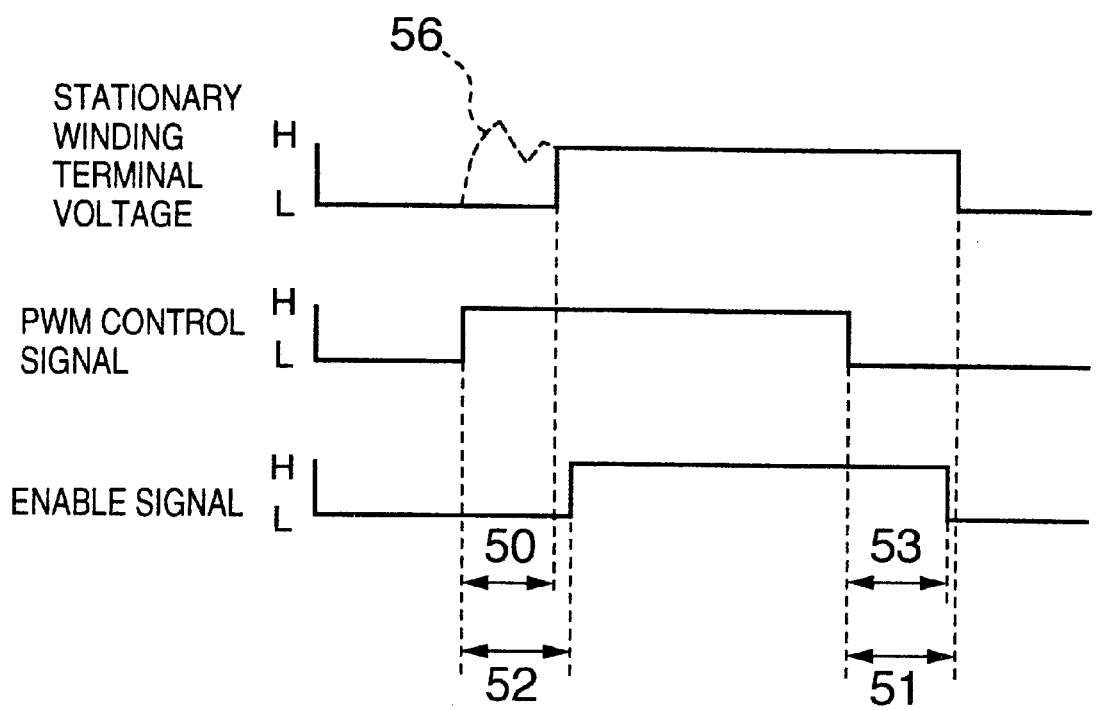
FIG. 14 is a timing chart for explaining a zero-cross point detection duration in the induced voltage in the prior art.
Figure 15:
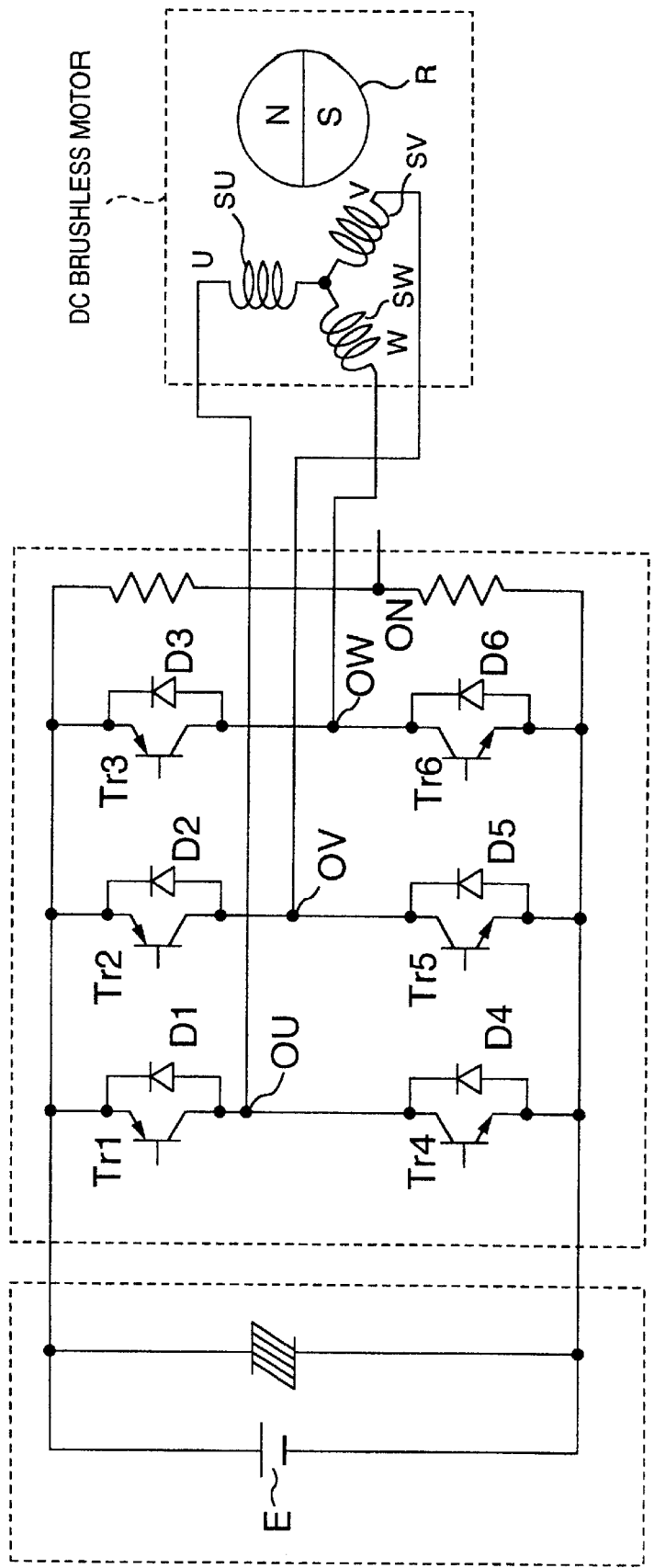
FIG. 15 is a major part of a conventional DC brushless motor drive control apparatus.

FIG. 10 shows a general arrangement of a DC brushless motor drive control apparatus to be driven in the sensorless mode according to a fourth embodiment of the present invention. The DC brushless motor drive control apparatus of the fourth embodiment is substantially the same as that of the third embodiment, except that the turning OFF timing point of the switching element is delayed in order to realize the zero-cross point extraction timing with the maximum width of the PWM control signal. Accordingly, in the fourth embodiment, the parts common to the third and fourth embodiments are denoted by the same reference numerals, and the explanation thereof is omitted here because its detailed explanation has been already made in the third embodiment. FIG. 11 is a timing chart for explaining how to detect a zero-cross point in an induced voltage in the DC brushless motor drive control apparatus of the third embodiment. FIG. 11, reference numeral 40 denotes an enable signal for position detection, 41 denotes a zero-cross point detection duration of the induced voltage, 42 denotes a delay duration after the delay duration 42 is turned OFF until the induced voltage disappears, and 55 denotes a base voltage of an element.

In FIG. 10, explanation will be made as to a process by which the PWM control signal generating means 31 generates the PWM control signal 36. A triangle wave 38 generated by the PWM control signal generating means 31 is compared by the PWM control signal generating means 31 with the ON-width control signal voltage (see FIG. 9) of the PWM control signal generated by the speed command voltage generating means 30. As a result, the PWM control signal generating means 31 generates the PWM control signal 36. The enable signal generating means 32 turns ON the enable signal 40 at the falling edge of the triangle wave generation clock 37. Thereby, the logical operating means 29 starts the detection of the zero-cross point detection duration 41. The above is the same as in the third embodiment.

In the fourth embodiment, as shown in FIG. 11, the logical operating means 29 turns OFF the enable signal 40 immediately before the PWM control signal 36 is turned OFF and turns OFF the base voltage 55 of the switching element after elapsing a predetermined delay time 42. Thereby, the induced voltage is vanished. The logical operating means 29 can detect a state variation in the output signals of the comparators 23–25 only during the ON time of the enable signal 40. Accordingly, as the turning OFF time point of the switching element is delayed, the ON widths of the PWM control signal 36 and enable signal 40 become both maximum. Further, at the end time point of the ON time duration, a flag is set indicative of the completion of the zero-cross point detection. In this way, the magnetic pole position detection device of the fourth embodiment can utilize the ON width of the enable signal with maximum and can have a sufficient detection duration.

It is possible to reliably avoid the vibratory phenomenon 35 generated in the coil by providing the vibratory phenomenon avoidance delay time based on the rising or falling edge of the enable signal 40 and detecting the zero-cross point at this time point. How to select and generate the vibratory phenomenon avoidance delay time can be substantially the same as in the first embodiment, or may be calculated and set by providing the counter as in the third embodiment. That is, the time width corresponding to ½ of the ON width of the PWM control signal 36 is selected through calculation. However, as the switching is delayed, a short extraction timing signal (not shown) may be generated at the falling edge of the vibratory phenomenon avoidance delay time to be used for the end timing (extraction timing) of the vibratory phenomenon avoidance delay time. The vibratory phenomenon can be most reliably avoided, and the zero-cross point in the induced voltage can be detected even when the ON time of the PWM control signal is small.

The enable signal generating means 32 generates the enable signal 40 at the falling edge of the triangle wave generation clock 37 in the foregoing embodiment. However, as mentioned above in connection with the second embodiment, the same operation is substantially provided by utilize the rising edge of the triangle wave generation clock using an inversion circuit.

As will be seen from the explanation of the first to fourth embodiments, the rotor magnetic pole position detection device of the present invention has the following excellent effects.

According to the first aspect of the present invention, the logical operating means detects whether or not the induced voltage of each of the stationary windings is zero-crossed at the rising or falling edge of the triangle wave generation clock for generating the PWM control signal. Therefore, even when a drive voltage is intermittently supplied to the stationary windings under control of the PWM control signal in a drive mode, the induced voltages of the stationary windings are possible to be compared with a reference voltage to detect the zero-cross point in the induced voltage. Further, the influence of the attenuating vibration waveform at the time of the transient response appearing in the induced voltage can be reliably avoided in a simple manner.

According to the second aspect of the present invention, the logical operating means detects whether or not the induced voltage of each of the stationary windings is zero-crossed at a time point after elapsing the vibratory phenomenon avoidance delay time from the rising or falling edge of the triangle wave generation clock. Therefore, it is possible to delay the influence of the attenuating vibration waveform at the transient response time, which appears in the induced voltage, by the vibratory phenomenon avoidance delay time to avoid it, so that it is possible to avoid the influence of the attenuating vibration waveform more reliably. Further, it is possible to perform the detection even when the ON width of the PWM control signal is small.

According to the third aspect of the present invention, the enable signal is turned ON at the rising or falling edge of the triangle wave generation clock and is turned OFF immediately before the PWM control signal is turned OFF to detect whether or not the induced voltage of each of the stationary windings is zero-crossed only during the period in which the enable signal is ON. Therefore, even when the ON width (duty ratio) of the PWM control signal is small, it is possible to delay the detection time after the rising or falling edge of the triangle wave generation clock using the enable signal to avoid the influence of the attenuating vibration waveform in the induced voltage of the stationary windings. Further, even when the rotor rotates at a high speed, it is possible to reduce the detection delay because the detection duration using the enable signal is provided.

According to the fourth aspect of the present invention, the counter is used to count the vibratory phenomenon avoidance delay time, and when the counter counts out, the zero-cross point detection is carried out. Therefore, it is possible to set and change the vibratory phenomenon avoidance delay time digitally and simply to set it with a high flexibility and to increase the utilization efficiency of the logical operating means.

According to the fifth aspect of the present invention, the enable signal is used to apply the interruption to the logical operating means, and the counter is used to count the vibratory phenomenon avoidance delay time. Therefore, the enable signal can be used also as the interrupt timing signal.

According to the sixth aspect of the present invention, the counter is an up-down counter, and the zero-cross is detected when the count-down carry is output after the count up. Therefore, the logical "AND" operation is performed over two conditions that the counter reaches the carry and that the enable signal is in the ON state, so that it is possible to carry out the control easily and accurately.

According to the seventh aspect of the present invention, the switching element is turned OFF after delaying by a predetermined duration with respect to the falling edge of the PWM control signal, and the logical operating means detects whether or not the induced voltage of each of the stationary windings is zero-crossed after elapsing the vibratory phenomenon avoidance delay time form the rising or falling edge of the triangle wave generation clock for generating the PWM control signal. Therefore, it is possible to delay the turning OFF of the switching element and it is possible to prolong the ON times of the PWM control signal and enable signal with the maximum utilization. Further, it is possible to prolong the vibratory phenomenon avoidance delay time. Accordingly, the influence of the attenuating vibration waveform at the time of the transient response appearing in the induced voltage can be more reliably avoided.

According to the eighth aspect of the present invention, the logical operating means detects whether or not the induced voltage of each of the stationary windings is zero-crossed at the falling edge point of the enable signal. Therefore, it is possible to prolong the vibratory phenomenon avoidance delay time to the maximum, and it is possible to delay the detection time to the maximum width of the enable signal. Thereby, the influence of the attenuating vibration waveform in the induced voltage can be avoided most highly.

According to the ninth aspect of the present invention, the enable signal is generated when the counter counts about ½ of the ON time of the PWM control signal to perform the zero-cross detection. Therefore, the influence of the attenuating vibration waveform at the time of the transient response which appears in the induced voltage can be reliably avoided, and the interruption time point can be set and changed in a simple manner with a high flexibility.

What is claimed is:

1. A rotor magnetic pole position detection device for detecting a zero-cross point in a induced voltage induced in a stationary winding under a PWM control, and used in a DC brushless motor drive control apparatus to be driven in a sensorless mode, comprising:

a detection circuit for detecting terminal voltages of a plurality of stationary windings;

a reference voltage generation circuit for generating a reference voltage;

comparison means for comparing said terminal voltages with said reference voltage;

speed command voltage generation means for generating a PWM ON-width control signal;

PWM control signal generation means for generating a PWM control signal having a duty ratio corresponding to said PWM ON-width control signal;

logical operating means for obtaining phase signals from signals from said comparison means and for outputting energization timing signals based on said phase signals and said PWM control signal; and a driver circuit for energizing said stationary windings based on said energization timing signals, wherein said logical operating means detects whether or not the induced voltage of each of said stationary windings is zero-crossed at a rising or falling edge of a triangle wave generation clock for generating said PWM control signal.

2. A rotor magnetic pole position detection device as set forth in claim 1, wherein said logical operating means detects whether or not the induced voltage of each of said stationary windings is zero-crossed after elapsing a vibratory phenomenon avoidance delay time after the rising or falling edge of said triangle wave generation clock, in stead of detecting whether or not the induced voltage of each of said stationary windings is zero-crossed at the rising or falling edge of said triangle wave generation clock.

3. A rotor magnetic pole position detection device as set forth in claim 1, further comprising enable signal generation means for generating an enable signal which permits a detection of the zero-cross point, wherein said enable signal is turned ON at the rising or falling edge of said triangle wave generation clock, and is turned OFF immediately before said PWM control signal is turned OFF; and said logical operating means detects whether or not the induced voltage of each of said stationary windings is zero-crossed only during a period in which said enable signal is in an ON state.

4. A rotor magnetic pole position detection device as set forth in claim 2, further comprising enable signal generation means for generating an enable signal which permits a detection of the zero-cross point, wherein said enable signal is turned ON at the rising or falling edge of said triangle wave generation clock, and is turned OFF immediately before said PWM control signal is turned OFF; and said logical operating means detects whether or not the induced voltage of each of said stationary windings is zero-crossed only during a period in which said enable signal is in an ON state.

5. A rotor magnetic pole position detection device as set forth in claim 4, wherein a vibratory phenomenon avoidance delay time is counted by a counter; and when said counter counts out, said zero-cross point is detected.

6. A rotor magnetic pole position detection device as set forth in claim 5, wherein said logical operating means is interrupted by said enable signal; and said vibratory phenomenon avoidance delay time is counted by said counter.

7. A rotor magnetic pole position detection device as set forth in claim 5, wherein said counter is an up-down counter; and said up-down counter counts down after counting up and detects said zero-cross point when reaching a count-down carry.

8. A rotor magnetic pole position detection device as set forth in claim 4, wherein a switching element is turned OFF after elapsing a predetermined duration from a falling edge of said PWM control signal; and said logical operating means detects whether or not the induced voltage of each of said stationary windings is zero-crossed after elapsing said vibratory phenomenon avoidance delay time from the rising or falling edge of said triangle wave generation clock for generating said PWM control signal.

9. A rotor magnetic pole position detection device as set forth in claim 5, wherein a switching element is turned OFF after elapsing a predetermined duration from a falling edge of said PWM control signal; and said logical operating means detects whether or not the induced voltage of each of said stationary windings is zero-crossed after elapsing said vibratory phenomenon avoidance delay time from the rising or falling edge of said triangle wave generation clock for generating said PWM control signal.

10. A rotor magnetic pole position detection device as set forth in claim 6, wherein a switching element is turned OFF after elapsing a predetermined duration from a falling edge of said PWM control signal; and said logical operating means detects whether or not the induced voltage of each of said stationary windings is zero-crossed after elapsing said vibratory phenomenon avoidance delay time from the rising or falling edge of said triangle wave generation clock for generating said PWM control signal.

11. A rotor magnetic pole position detection device as set forth in claim 7, wherein a switching element is turned OFF after elapsing a predetermined duration from a falling edge of said PWM control signal; and said logical operating means detects whether or not the induced voltage of each of said stationary windings is zero-crossed after elapsing said vibratory phenomenon avoidance delay time from the rising or falling edge of said triangle wave generation clock for generating said PWM control signal.

12. A rotor magnetic pole position detection device as set forth in claim 7, wherein said vibratory phenomenon avoidance delay time is set equal to an ON time duration of said enable signal; and said logical operating means detects whether or not the induced voltage of each of said stationary windings is zero-crossed at a falling edge of said enable signal.

13. A rotor magnetic pole position detection device as set forth in claim 5, wherein said logical operating means detects a zero cross by generating said enable signal when said counter counts about ½ of an ON time of said PWM control signal, in stead of turning ON said enable signal at the rising or falling edge of said triangle wave generation clock.

\* \* \* \* \*